(12) United States Patent
Hristov et al.

(10) Patent No.: US 8,704,779 B2
(45) Date of Patent: Apr. 22, 2014

(54) MULTIPLE ELECTRODE TOUCH SENSITIVE DEVICE

(75) Inventors: Luben Hristov, Sofia (BG); Harald Philipp, Hamble (GB)

(73) Assignee: Atmel Corporation, San Jose, CA (US)

( * ) Notice: Subject to any disclaimer, the term of this patent is extended or adjusted under 35 U.S.C. 154(b) by 1051 days.

(21) Appl. No.: 12/643,622

(22) Filed: Dec. 21, 2009

(65) Prior Publication Data

US 2010/0164889 A1 Jul. 1, 2010

Related U.S. Application Data

(60) Provisional application No. 61/203,595, filed on Dec. 26, 2008.

(51) Int. Cl.
*G06F 3/041* (2006.01)
(52) U.S. Cl.
USPC .......................... 345/173; 369/173; 369/174
(58) Field of Classification Search
USPC .................................................. 345/173, 174
See application file for complete search history.

(56) References Cited

U.S. PATENT DOCUMENTS

| 4,587,378 | A | 5/1986 | Moore |
| 6,452,514 | B1 | 9/2002 | Philipp |
| 7,663,607 | B2 | 2/2010 | Hotelling et al. |
| 7,864,503 | B2 | 1/2011 | Chang |
| 7,875,814 | B2 | 1/2011 | Chen et al. |
| 7,920,129 | B2 | 4/2011 | Hotelling et al. |
| 8,031,094 | B2 | 10/2011 | Hotelling et al. |
| 8,031,174 | B2 | 10/2011 | Hamblin et al. |
| 8,040,326 | B2 | 10/2011 | Hotelling et al. |
| 8,049,732 | B2 | 11/2011 | Hotelling et al. |
| 8,179,381 | B2 | 5/2012 | Frey et al. |
| 8,217,902 | B2 | 7/2012 | Chang et al. |
| 2007/0257894 | A1* | 11/2007 | Philipp .......................... 345/173 |
| 2008/0018608 | A1* | 1/2008 | Serban et al. .................. 345/173 |
| 2008/0158180 | A1* | 7/2008 | Krah et al. ..................... 345/173 |

(Continued)

FOREIGN PATENT DOCUMENTS

| DE | 202007006407 U1 | 9/2007 |
| DE | 102008028224 A1 | 2/2008 |

(Continued)

OTHER PUBLICATIONS

"International Application Serial No. PCT/US2009/069057, International Search Report mailed Oct. 18, 2010", 4 pgs.

(Continued)

*Primary Examiner* — Latanya Bibbins
(74) *Attorney, Agent, or Firm* — Baker Botts LLP

(57) ABSTRACT

Two different sets of electrodes in a touch sensitive device are formed to produce an electric field gradient from one end of the electrodes to the other end when opposite ends of the electrodes are driven with different voltages. A signal measuring cycle is performed by alternately driving the ends of one set of electrodes, while using the other set of electrodes to receive signals. The roles of the sets of electrodes are then reversed, such that the set that that was driven is now used to receive signals from the other set of electrodes. Reference signals may be obtained by driving both sides of one set of electrodes, and then both sides of the other set of electrodes. The signals obtained are then used to determine the touch position on the touch sensitive device.

10 Claims, 31 Drawing Sheets

(56) References Cited

U.S. PATENT DOCUMENTS

| | | |
|---|---|---|
| 2008/0309633 A1 | 12/2008 | Hotelling et al. |
| 2008/0309635 A1 | 12/2008 | Matsuo |
| 2009/0315854 A1 | 12/2009 | Matsuo |
| 2010/0073307 A1 * | 3/2010 | Liu et al. ................ 345/173 |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0243719 A1 | 9/2012 | Franklin et al. |
| 2013/0076612 A1 | 3/2013 | Myers |

FOREIGN PATENT DOCUMENTS

| | | |
|---|---|---|
| WO | WO-2008/009687 A2 | 1/2008 |
| WO | WO-2010/075308 A2 | 7/2010 |
| WO | WO 2012/129247 | 9/2012 |

OTHER PUBLICATIONS

"International Application Serial No. PCT/US2009/069057, Written Opinion mailed Oct. 18, 2010", 6 pgs.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

* cited by examiner

| BURST # | VERT0 | VERT1 | HOR0 | HOR1 | SIGNAL | DESCRIPTION |
|---|---|---|---|---|---|---|
| 1 | DRIVE | GND | FLOAT | ACQUIRE | SV1 | MEASURE THE SIGNAL WITH VERTICAL GRADIENT. MAX SIGNAL ON VERT0 END, MIN SIGNAL ON VERT1 END |
| 2 | GND | DRIVE | FLOAT | ACQUIRE | SV2 | MEASURE THE SIGNAL WITH VERTICAL GRADIENT. MAX SIGNAL ON VERT1 END, MIN SIGNAL ON VERT0 END |
| 3 | DRIVE | DRIVE | FLOAT | ACQUIRE | RV | MEASURE THE SIGNAL WITHOUT VERTICAL GRADIENT. THE SIGNAL IS THE SAME ON THE WHOLE SCREEN |
| 4 | FLOAT | ACQUIRE | DRIVE | GND | SH1 | MEASURE THE SIGNAL WITH HORIZONTAL GRADIENT. MAX SIGNAL ON HOR0 END, MIN SIGNAL ON HOR1 END |
| 5 | FLOAT | ACQUIRE | FLOAT | DRIVE | SH2 | MEASURE THE SIGNAL WITH HORIZONTAL GRADIENT. MAX SIGNAL ON HOR1 END, MIN SIGNAL ON HOR0 END |
| 6 | FLOAT | ACQUIRE | GND | DRIVE | RH | MEASURE THE SIGNAL WITHOUT HORIZONTAL GRADIENT. THE SIGNAL IS THE SAME ON THE WHOLE SCREEN |

*FIG. 6*

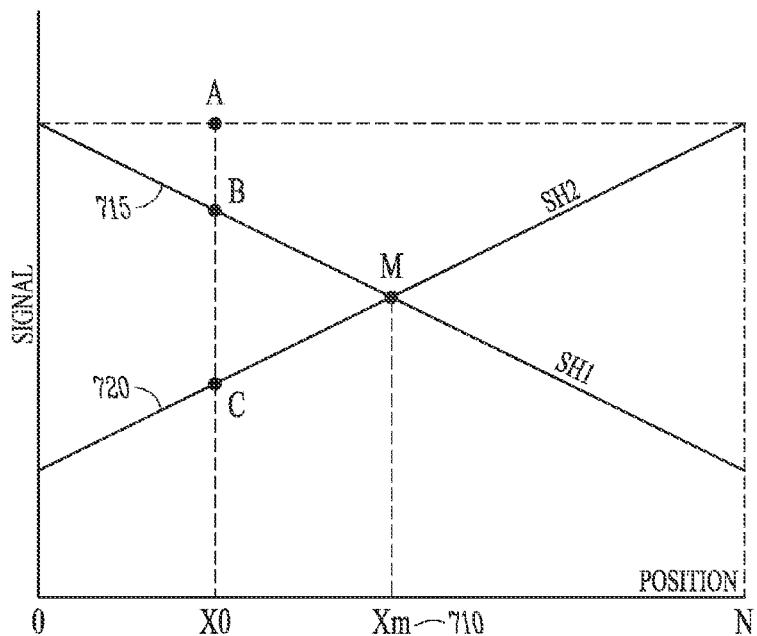

*FIG. 7*

| STEP | V0 | MV | V1 | H0 | MH | H1 | CHRG | DESCRIPTION |
|---|---|---|---|---|---|---|---|---|
| 1 | 0 | 0 | 0 | 0 | 0 | 0 | 0 | INITIAL DISCHARGE STATE - ALL CAPACITORS WILL BE FULLY DISCHARGED |
| 2 | 0 | F | 0 | F | 0 | F | 0 | FLOATING STATE |
| 3 | 1 | F | 0 | F | 0 | F | 0 | CHARGE TRANSFER - CHARGE ACCUMULATING ON Cs1 |
| 4 | 1 | F | 0 | F | F | F | 0 | END OF THE CHARGE TRANSFER BY FLOATING Cs |
| 5 | 1 | F | 0 | F | F | 0 | 0 | DISCHARGE Cp BY DRIVING H1 TO GND |
| 6 | 0 | F | 0 | F | F | 0 | 0 | DISCHARGE Cx |
| 7 | 0 | F | 0 | F | F | F | 0 | FLOAT H1 TO PREPARE FOR THE NEXT TRANSFER |
| 8 | 0 | F | 0 | F | 0 | F | 0 | GROUND Cs TO PREPARE FOR THE NEXT TRANSFER |
| 9 | | | | | | | | GO TO STEP 3 N TIMES UNTIL THE BURST COMPLETED |
| 10 | 0 | F | 0 | F | F | F | 0 | FLOAT MH TO PREPARE FOR THE MEASUREMENT |
| 11 | 0 | F | 0 | F | AN | 0 | 0 | MAKE MH ANALOG COMPARATOR INPUT AND H1 TO GND |
| 12 | 0 | F | 0 | F | AN | 0 | 1 | DO THE MEASUREMENT OF THE SIGNAL (BY RAMPING UP) |

FIG. 8

| STEP | V0 | MV | V1 | H0 | MH | H1 | CHRG | DESCRIPTION |
|---|---|---|---|---|---|---|---|---|
| 1 | 0 | 0 | 0 | 0 | 0 | 0 | 0 | INITIAL DISCHARGE STATE - ALL CAPACITORS WILL BE FULLY DISCHARGED |
| 2 | 0 | F | 0 | F | 0 | F | 0 | FLOATING STATE |
| 3 | 0 | F | 1 | F | 0 | F | 0 | CHARGE TRANSFER - CHARGE ACCUMULATING ON Cs1 |
| 4 | 0 | F | 1 | F | F | F | 0 | END OF THE CHARGE TRANSFER BY FLOATING Cs |
| 5 | 0 | F | 1 | F | F | 0 | 0 | DISCHARGE Cp BY DRIVING H1 TO GND |
| 6 | 0 | F | 0 | F | F | 0 | 0 | DISCHARGE Cx |
| 7 | 0 | F | 0 | F | F | F | 0 | FLOAT H1 TO PREPARE FOR THE NEXT TRANSFER |
| 8 | 0 | F | 0 | F | 0 | F | 0 | GROUND Cs TO PREPARE FOR THE NEXT TRANSFER |
| 9 | | | | | | | | GO TO STEP 3 N TIMES UNTIL THE BURST COMPLETED |
| 10 | 0 | F | 0 | F | F | F | 0 | FLOAT MH TO PREPARE FOR THE MEASUREMENT |
| 11 | 0 | F | 0 | F | AN | 0 | 0 | MAKE MH ANALOG COMPARATOR INPUT AND H1 TO GND |
| 12 | 0 | F | 0 | F | AN | 0 | 1 | DO THE MEASUREMENT OF THE SIGNAL (BY RAMPING UP) |

*FIG. 9*

| STEP | V0 | MV | V1 | H0 | MH | H1 | CHRG | DESCRIPTION |
|---|---|---|---|---|---|---|---|---|
| 1 | 0 | 0 | 0 | 0 | 0 | 0 | 0 | INITIAL DISCHARGE STATE - ALL CAPACITORS WILL BE FULLY DISCHARGED |
| 2 | 0 | F | 0 | F | 0 | 0 | 0 | FLOATING STATE |
| 3 | 1 | F | 1 | F | 0 | F | 0 | CHARGE TRANSFER - CHARGE ACCUMULATING ON Cs1 |
| 4 | 1 | F | 0 | F | F | F | 0 | END OF THE CHARGE TRANSFER BY FLOATING Cs |
| 5 | 1 | F | 1 | F | F | F | 0 | DISCHARGE Cp BY DRIVING H1 TO GND |
| 6 | 0 | F | 0 | F | F | 0 | 0 | DISCHARGE Cx |
| 7 | 0 | F | 0 | F | F | F | 0 | FLOAT H1 TO PREPARE FOR THE NEXT TRANSFER |
| 8 | 0 | F | 0 | F | 0 | F | 0 | GROUND Cs TO PREPARE FOR THE NEXT TRANSFER |
| 9 | | | | | | | | GO TO STEP 3 N TIMES UNTIL THE BURST COMPLETED |
| 10 | 0 | F | 0 | F | F | F | 0 | FLOAT MH TO PREPARE FOR THE MEASUREMENT |
| 11 | 0 | F | 0 | F | AN | 0 | 0 | MAKE MH ANALOG COMPARATOR INPUT AND H1 TO GND |
| 12 | 0 | F | 0 | F | AN | 0 | 1 | DO THE MEASUREMENT OF THE SIGNAL (BY RAMPING UP) |

*FIG. 10*

| STEP | V0 | MV | V1 | H0 | MH | H1 | CHRG | DESCRIPTION |
|---|---|---|---|---|---|---|---|---|
| 1 | 0 | 0 | 0 | 0 | 0 | 0 | 0 | INITIAL DISCHARGE STATE - ALL CAPACITORS WILL BE FULLY DISCHARGED |
| 2 | F | 0 | F | 1 | F | 0 | 0 | FLOATING STATE |
| 3 | F | 0 | F | 1 | F | 0 | 0 | CHARGE TRANSFER - CHARGE ACCUMULATING ON Cs0 |
| 4 | F | F | F | 1 | F | 0 | 0 | END OF THE CHARGE TRANSFER BY FLOATING Cs |
| 5 | F | F | 0 | 0 | F | 0 | 0 | DISCHARGE Cp BY DRIVING v1 TO GND |
| 6 | F | F | 0 | 0 | F | 0 | 0 | DISCHARGE Cx |
| 7 | F | F | F | 0 | F | 0 | 0 | FLOAT V1 TO PREPARE FOR THE NEXT TRANSFER |
| 8 | F | 0 | F | 0 | F | 0 | 0 | GROUND Cs TO PREPARE FOR THE NEXT TRANSFER |
| 9 | | | | | | | | GO TO STEP 3 N TIMES UNTIL THE BURST COMPLETED |
| 10 | F | F | F | 0 | F | 0 | 0 | FLOAT MV TO PREPARE FOR THE MEASUREMENT |
| 11 | F | AN | 0 | 0 | F | 0 | 0 | MAKE MV ANALOG COMPARATOR INPUT AND H1 TO GND |
| 12 | F | AN | 0 | 0 | F | 0 | 1 | DO THE MEASUREMENT OF THE SIGNAL (BY RAMPING UP) |

*FIG. 11*

| STEP | V0 | MV | V1 | H0 | MH | H1 | CHRG | DESCRIPTION |
|---|---|---|---|---|---|---|---|---|
| 1 | 0 | 0 | 0 | 0 | 0 | 0 | 0 | INITIAL DISCHARGE STATE - ALL CAPACITORS WILL BE FULLY DISCHARGED |
| 2 | F | 0 | F | 0 | F | 0 | 0 | FLOATING STATE |
| 3 | F | 0 | F | 0 | F | 1 | 0 | CHARGE TRANSFER - CHARGE ACCUMULATING ON Cs0 |
| 4 | F | F | F | 0 | F | 1 | 0 | END OF THE CHARGE TRANSFER BY FLOATING Cs |
| 5 | F | F | 0 | 0 | F | 1 | 0 | DISCHARGE Cp BY DRIVING V1 TO GND |
| 6 | F | F | 0 | 0 | F | 0 | 0 | DISCHARGE Cx |
| 7 | F | F | F | 0 | F | 0 | 0 | FLOAT V1 TO PREPARE FOR THE NEXT TRANSFER |
| 8 | F | 0 | F | 0 | F | 0 | 0 | GROUND Cs TO PREPARE FOR THE NEXT TRANSFER |
| 9 | | | | | | | | GO TO STEP 3 N TIMES UNTIL THE BURST COMPLETED |
| 10 | F | F | F | 0 | F | 0 | 0 | FLOAT MV TO PREPARE FOR THE MEASUREMENT |
| 11 | F | AN | 0 | 0 | F | 0 | 0 | MAKE MV ANALOG COMPARATOR INPUT AND H1 TO GND |
| 12 | F | AN | 0 | 0 | F | 0 | 1 | DO THE MEASUREMENT OF THE SIGNAL (BY RAMPING UP) |

FIG. 12

| STEP | V0 | MV | V1 | H0 | MH | H1 | CHRG | DESCRIPTION |
|---|---|---|---|---|---|---|---|---|
| 1 | 0 | 0 | 0 | 0 | 0 | 0 | 0 | INITIAL DISCHARGE STATE - ALL CAPACITORS WILL BE FULLY DISCHARGED |
| 2 | F | 0 | F | 0 | F | 0 | 0 | FLOATING STATE |
| 3 | F | 0 | F | 1 | F | 1 | 0 | CHARGE TRANSFER - CHARGE ACCUMULATING ON Cs0 |
| 4 | F | F | F | 1 | F | 0 | 0 | END OF THE CHARGE TRANSFER BY FLOATING Cs |
| 5 | F | F | 0 | 1 | F | 1 | 0 | DISCHARGE Cp BY DRIVING v1 TO GND |
| 6 | F | F | 0 | 0 | F | 0 | 0 | DISCHARGE Cx |
| 7 | F | F | F | 0 | F | 0 | 0 | FLOAT v1 TO PREPARE FOR THE NEXT TRANSFER |
| 8 | F | 0 | F | 0 | F | 0 | 0 | GROUND Cs TO PREPARE FOR THE NEXT TRANSFER |
| 9 | | | | | | | | GO TO STEP 3 N TIMES UNTIL THE BURST COMPLETED |
| 10 | F | F | F | 0 | F | 0 | 0 | FLOAT MV TO PREPARE FOR THE MEASUREMENT |
| 11 | F | AN | 0 | 0 | F | 0 | 0 | MAKE MV ANALOG COMPARATOR INPUT AND H1 TO GND |
| 12 | F | AN | 0 | 0 | F | 0 | 1 | DO THE MEASUREMENT OF THE SIGNAL (BY RAMPING UP) |

*FIG. 13*

| STEP | V0 | MV | V1 | H0 | MH | H1 | CHRG | DESCRIPTION |
|---|---|---|---|---|---|---|---|---|
| 1 | F | 0 | 0 | F | 0 | 0 | F | INITIAL DISCHARGE STATE - ALL CAPACITORS WILL BE FULLY DISCHARGED |
| 2 | F | F | F | F | F | F | F | FLOATING STATE |
| 3 | F | 1 | F | F | 1 | F | F | CHARGE TRANSFER - CHARGE ACCUMULATING ON Cs0 AND Cs1 |
| 4 | F | F | F | F | F | F | F | END OF THE CHARGE TRANSFER - FLOATING STATE |
| 5 | F | F | 0 | F | F | 0 | F | DISCHARGE Cx AND PREPARE FOR MEASURE |
| 6 | F | F | 0 | F | F | 0 | F | MEASURING STATE - ON THE FIRST OCCURRENCE OF LOGICAL ONE ON MV AND MH RECORD THE BURST LENGTH IN THE CORRESPONDING SIGNAL, IF ONE OF MV OR MH IS ZERO - GO TO STEP 2 |
| 7 | F | 0 | 0 | F | 0 | 0 | F | FINAL DISCHARGE STATE - ALL CAPACITORS WILL BE FULLY DISCHARGED |

*FIG. 16*

| BURST # | VERT0 | VERT1 | VERT2 | HOR0 | HOR1 | SIGNAL | DESCRIPTION |
|---|---|---|---|---|---|---|---|
| 1 | DRIVE | GND | GND | FLOAT | ACQUIRE | SV1 | MEASURE THE SIGNAL WITH VERTICAL GRADIENT. MAX SIGNAL ON VERT0 END, MIN SIGNAL ON VERT1, VERT2 END |
| 2 | GND | DRIVE | GND | FLOAT | ACQUIRE | SV2 | MEASURE THE SIGNAL WITH VERTICAL GRADIENT. MAX SIGNAL ON VERT1 END, MIN SIGNAL ON VERT0, VERT2 END |
| 3 | GND | GND | DRIVE | FLOAT | ACQUIRE | SV3 | MEASURE THE SIGNAL WITH VERTICAL GRADIENT. MAX SIGNAL ON VERT2 END, MIN SIGNAL ON VERT0, VERT1 END |
| 4 | DRIVE | DRIVE | DRIVE | FLOAT | ACQUIRE | RV | MEASURE THE SIGNAL WITHOUT VERTICAL GRADIENT. THE SIGNAL IS THE SAME ON THE WHOLE SCREEN |
| 5 | FLOAT | ACQUIRE | FLOAT | DRIVE | GND | SH1 | MEASURE THE SIGNAL WITH HORIZONTAL GRADIENT. MAX SIGNAL ON HOR0 END, MIN SIGNAL ON HOR1 END |
| 6 | FLOAT | ACQUIRE | FLOAT | GND | DRIVE | SH2 | MEASURE THE SIGNAL WITH HORIZONTAL GRADIENT. MAX SIGNAL ON HOR1 END, MIN SIGNAL ON HOR0 END |
| 7 | FLOAT | ACQUIRE | FLOAT | DRIVE | DRIVE | RH | MEASURE THE SIGNAL WITHOUT HORIZONTAL GRADIENT. THE SIGNAL IS THE SAME ON THE WHOLE SCREEN |

*FIG. 19*

| BURST # | VERT0 | VERT1 | VERT2 | VERT3 | HOR0 | HOR1 | SIGNAL | DESCRIPTION |
|---|---|---|---|---|---|---|---|---|
| 1 | DRIVE | GND | GND | GND | FLOAT | ACQUIRE | SV1 | MEASURE THE SIGNAL WITH VERTICAL GRADIENT. MAX SIGNAL ON VERT0 END, MIN SIGNAL ON VERT1, VERT2 & VERT3 END |
| 2 | GND | DRIVE | GND | GND | FLOAT | ACQUIRE | SV2 | MEASURE THE SIGNAL WITH VERTICAL GRADIENT. MAX SIGNAL ON VERT1 END, MIN SIGNAL ON VERT0, VERT2 & VERT3 END |
| 3 | GND | GND | DRIVE | GND | FLOAT | ACQUIRE | SV3 | MEASURE THE SIGNAL WITH VERTICAL GRADIENT. MAX SIGNAL ON VERT2 END, MIN SIGNAL ON VERT0, VERT1 & VERT3 END |
| 4 | GND | GND | GND | DRIVE | FLOAT | ACQUIRE | SV4 | MEASURE THE SIGNAL WITH VERTICAL GRADIENT. MAX SIGNAL ON VERT3 END, MIN SIGNAL ON VERT0, VERT1 & VERT2 END |
| 5 | DRIVE | DRIVE | DRIVE | DRIVE | FLOAT | ACQUIRE | RV | MEASURE THE SIGNAL WITHOUT VERTICAL GRADIENT. THE SIGNAL IS THE SAME ON THE WHOLE SCREEN |
| 6 | FLOAT | ACQUIRE | FLOAT | FLOAT | DRIVE | GND | SH1 | MEASURE THE SIGNAL WITH HORIZONTAL GRADIENT. MAX SIGNAL ON HOR0 END, MIN SIGNAL ON HOR1 END |
| 7 | FLOAT | ACQUIRE | FLOAT | FLOAT | GND | DRIVE | SH2 | MEASURE THE SIGNAL WITH HORIZONTAL GRADIENT. MAX SIGNAL ON HOR1 END, MIN SIGNAL ON HOR0 END |
| 8 | FLOAT | ACQUIRE | FLOAT | FLOAT | DRIVE | DRIVE | RH | MEASURE THE SIGNAL WITHOUT HORIZONTAL GRADIENT. THE SIGNAL IS THE SAME ON THE WHOLE SCREEN |

*FIG. 22*

| BURST # | VERT0 | VERT1 | VERT2 | VERT3 | HOR0 | HOR1 | HOR2 | SIGNAL | DESCRIPTION |
|---|---|---|---|---|---|---|---|---|---|
| 1 | DRIVE | GND | GND | GND | FLOAT | ACQUIRE | FLOAT | SV1 | MEASURE THE SIGNAL WITH VERTICAL GRADIENT. MAX SIGNAL ON VERT0 END, MIN SIGNAL ON VERT1, VERT2 & VERT3 END |
| 2 | GND | DRIVE | GND | GND | FLOAT | ACQUIRE | FLOAT | SV2 | MEASURE THE SIGNAL WITH VERTICAL GRADIENT. MAX SIGNAL ON VERT1 END, MIN SIGNAL ON VERT0, VERT2 & VERT3 END |
| 3 | GND | GND | DRIVE | GND | FLOAT | ACQUIRE | FLOAT | SV3 | MEASURE THE SIGNAL WITH VERTICAL GRADIENT. MAX SIGNAL ON VERT2 END, MIN SIGNAL ON VERT0, VERT1 & VERT3 END |
| 4 | GND | GND | GND | DRIVE | FLOAT | ACQUIRE | FLOAT | SV4 | MEASURE THE SIGNAL WITH VERTICAL GRADIENT. MAX SIGNAL ON VERT3 END, MIN SIGNAL ON VERT0, VERT1 & VERT2 END |
| 5 | DRIVE | DRIVE | DRIVE | DRIVE | FLOAT | ACQUIRE | FLOAT | RV | MEASURE THE SIGNAL WITHOUT VERTICAL GRADIENT. THE SIGNAL IS THE SAME ON THE WHOLE SCREEN |
| 6 | FLOAT | ACQUIRE | FLOAT | FLOAT | GND | GND | GND | SH1 | MEASURE THE SIGNAL WITH HORIZONTAL GRADIENT. MAX SIGNAL ON HOR0 END, MIN SIGNAL ON HOR1 & HOR2 END |
| 7 | FLOAT | ACQUIRE | FLOAT | FLOAT | DRIVE | DRIVE | GND | SH2 | MEASURE THE SIGNAL WITH HORIZONTAL GRADIENT. MAX SIGNAL ON HOR1 END, MIN SIGNAL ON HOR0 & HOR2 END |
| 8 | FLOAT | ACQUIRE | FLOAT | FLOAT | GND | GND | DRIVE | SH3 | MEASURE THE SIGNAL WITH HORIZONTAL GRADIENT. MAX SIGNAL ON HOR2 END, MIN SIGNAL ON HOR0 & HOR1 END |
| 9 | FLOAT | ACQUIRE | FLOAT | FLOAT | DRIVE | DRIVE | DRIVE | RH | MEASURE THE SIGNAL WITHOUT HORIZONTAL GRADIENT. THE SIGNAL IS THE SAME ON THE WHOLE SCREEN |

*FIG. 25*

MULTIPLE ELECTRODE TOUCH SENSITIVE DEVICE

RELATED APPLICATION

This application claims priority to U.S. Provisional Application Ser. No. 61/203,595 (entitled Four Electrodes QMA-TRIX Touch Screen, filed Dec. 26, 2008) which is incorporated herein by reference.

BACKGROUND

As touchscreens have gotten larger, the number of electrodes needed to sense touches on the larger touchscreens effectively has grown. Each such electrode is coupled to a pin on a controller. As the number of electrodes grows, so does the number of pins on the controller, adding to the complexity of the controller and wiring to couple the controller to the electrodes. In some prior touchscreens, electrode interpolation schemes have been used to increase the effective number of electrodes on the touchscreen, without increasing the number of required connections to controllers. Such interpolation schemes may not provide desired accuracy in determining touch locations.

SUMMARY

Two different sets of electrodes in a touch sensitive device are formed to produce an electric field gradient from one end of the electrodes to the other end when opposite ends of the electrodes are driven with different voltages. A signal measuring cycle is performed by alternately driving the ends of one set of electrodes while using the other set of electrodes to receive signals. The roles of the sets of electrodes are then reversed, such that the set that was driven is now used to receive signals from the other set of electrodes. Optional reference signals representative of touch strength may be obtained by driving both sides of one set of electrodes, and then both sides of the other set of electrodes. The signals obtained are then used to determine the touch position on the touch sensitive device.

BRIEF DESCRIPTION OF THE DRAWINGS

FIG. 6 is a table illustrating signals for detecting touch locations on a touch sensitive device according to an example embodiment.

FIG. 7 is a graph illustrating signals for horizontal measurement for a touch sensitive device according to an example embodiment.

FIGS. 8-13 are tables illustrating burst sequences used to obtain signals to determine touch location according to an example embodiment.

FIG. 16 is a table illustrating a proximity burst for detecting objects proximate a touch sensitive device according to an example embodiment.

FIG. 19 is a table illustrating an example burst sequence for the electrode layout of FIG. 17.

FIG. 22 is a table illustrating an example burst sequence for the electrode layout of FIG. 20.

FIG. 25 is a table illustrating an example burst sequence for the electrode layout of FIG. 23.

DETAILED DESCRIPTION

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

First and second sets of electrodes in a touch sensitive device are formed to produce an electric field gradient from one end of the electrodes to the other end when opposite ends of the electrodes are driven with different voltages. The sets of electrodes form a matrix from which touch position may be obtained with minimal connections to the matrix. A signal measuring cycle is performed by alternately driving the ends of the first set of electrodes, while using the other set of electrodes to receive signals. The roles of the sets of electrodes are then reversed, such that the second set of electrodes are driven as above with the first set used to receive signals. Reference signals representative of touch strength may be obtained by driving both sides of the first set of electrodes, and then both sides of the second set of electrodes. The signals obtained are then used to determine the touch position on the matrix of electrodes.

Several embodiments are described that create gradients of electric fields across electrodes formed of different materials. Some embodiments utilize resistors external to a sensing area with electrodes formed of highly conductive material. In some embodiments, the resistivity is high enough such that undesirably large currents do not result when the electrodes are driven to create the electric field gradient. Drive and receive sequences are also described, along with algorithms for determining touch positions.

Figure 1A:
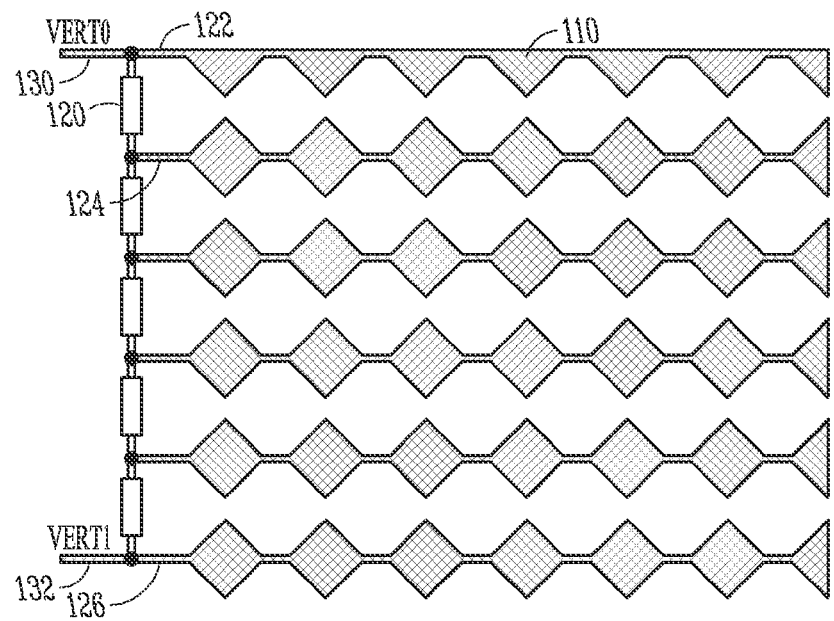
FIGS. 1A and 1B are top views of two electrodes of an electrode layout for a touch sensitive device according to an example embodiment.
Figure 1B:
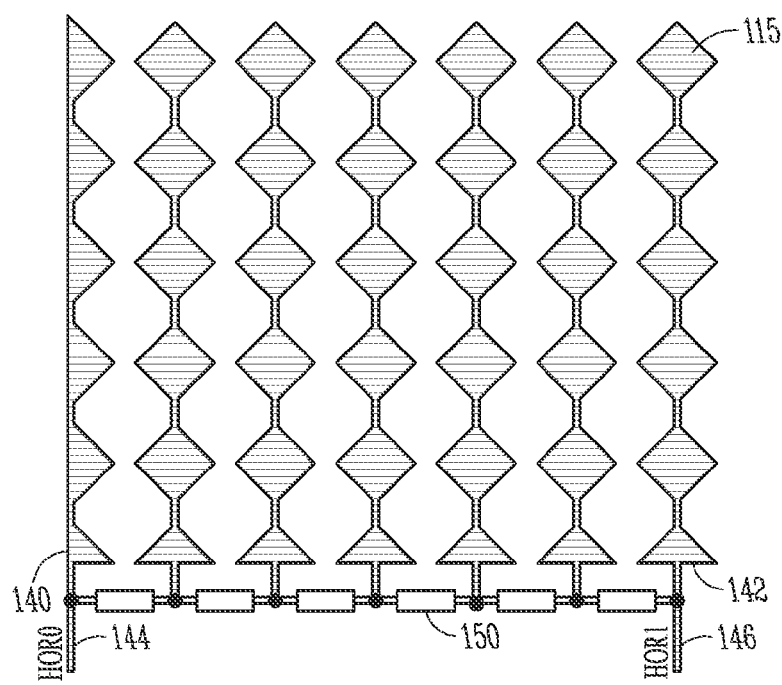
Figure 1C:
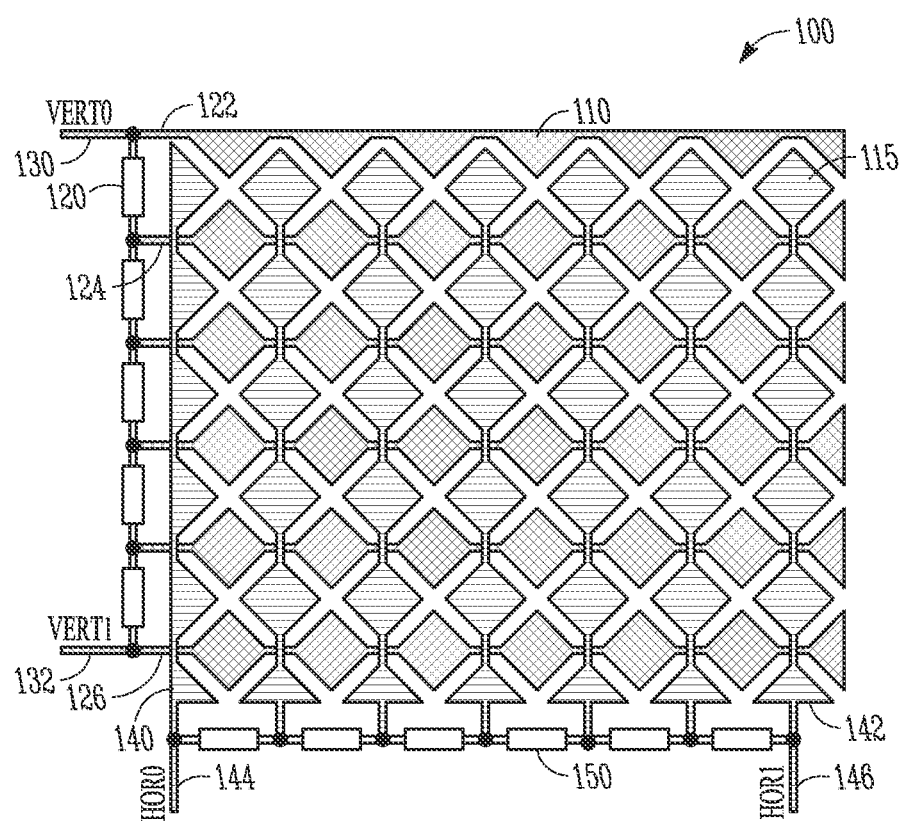
FIG. 1C is a top view of combined electrodes from FIGS. 1A and 1B.

FIGS. 1A, 1B and 1C are top views of separate and combined electrodes of a touch sensitive device 100 having a set of electrodes 110 exhibiting a vertical field gradient and a set of electrodes 115 exhibiting a horizontal field gradient. The electrodes in one embodiment are formed of highly conductive material such as copper. Many different highly conductive materials may be used, including many metals and other materials that provide little resistance to electrical signals.

In one embodiment, the set of electrodes 110 include multiple rows of horizontally disposed diamond shaped structures that are coupled together at horizontal corners by strips of conductive material. Adjacent rows are coupled by a resistor, as indicated for example at 120, coupling rows 122 and 124. In this embodiment, there are six such rows, ending in a row 126, all connected to a resistive chain 128. Row 122 is coupled to a conductive line 130, referred to as VERT0. Row 126 is coupled to a conductive line 132, referred to as VERT1. In one embodiment, lines 130 and 132 may be selectively coupled to drive circuitry, and line 132 may be selectively coupled to sense circuitry which is not shown in FIG. 1. Conductors 130 and 132 are also coupled through the resistors between the rows of electrodes, such as resistor 120. The resistive chain 128 operates as a resistive divider that creates an electric field gradient in the rows of electrodes in a vertical direction when either of the VERT0 or VERT1 lines are driven with a drive voltage, with the other line held at a reference voltage, such as ground. Each resistor acts as an attenuator to reduce the voltage applied to the next electrode, while end rows are driven with at the drive voltage or are tied to the reference voltage.

A horizontal electric field gradient is produced in a similar manner in columns of inter-connected diamond shapes corresponding to electrode set 115. Outside columns are indicated at 140 and 142, and are coupled to conductive lines 144 (HOR0) and 146 (HOR1) respectively. The columns of electrodes are coupled together via a resistive chain 150, that includes resistors extending between the conductive lines 144 and 146, and coupled to the columns to create an electric field gradient in the columns of electrodes in a horizontal direction when either of the HOR0 or HOR1 lines are driven, with the other line held at a reference voltage, such as ground. In some embodiments, the resistive chains may be formed of discrete resistive elements.

The two sets of electrodes 110 and 115 form an electrode pattern that appears as a grid of diamond shapes. The electrodes may be formed on the same layer with insulated crossovers, or may be formed as two separate layers separated by an insulating layer. Various conductive materials, such as ITO (indium tin oxide) and PEDOT (Polyethylenedioxythiophene) copper or silver paint (when used in fine line mesh patterns for touchscreens) may be used to form the electrodes. The resistive chains 120, 150 in one embodiment, form resistive bridges which create a smooth gradient of the electric fields in both the horizontal and vertical directions. The resistive chains 120, 150 may be located outside edges of the sets of electrodes.

Figure 2:
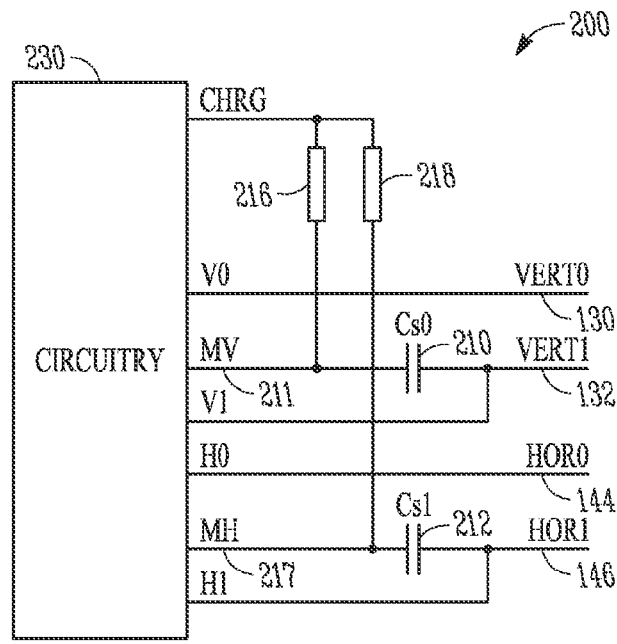
FIG. 2 is a block circuit diagram illustrating connections and circuitry to interface with a touch sensitive device according to an example embodiment.

FIG. 2 is a schematic representation of example circuitry 200 for driving and receiving signals on the electrode pattern 100 of FIG. 1. Many different methods of driving and receiving signals may be employed, and circuitry 200 is just one example. Each of the lines VERT0 130, VERT1 132, HOR0 144, and HOR1 146 are driven by corresponding voltages V0, V1, H0, H1. In one embodiment, line VERT1 is coupled to a sense capacitor Cs0 at 210, which may be further coupled via a line labeled MV at 211 to a ramping resistor 216 for measuring transferred charge on Cs0. Line HOR1 is coupled to a sense capacitor Cs1 at 212, which may be further coupled via a line labeled MH at 217 to a ramping resistor 218 for measuring transferred charge on Cs1. Circuitry 220 is coupled to the ramping resistors to receive and measure the charge from the sense capacitors. The ramping resistors are used for analog to digital conversion, and may be replaced with other analog to digital converters in further embodiments. In further embodiments, the sense capacitors may be replaced by circuitry that may include integrators and operational amplifiers, or other means of sensing charge. Circuitry 230 may also be coupled to lines MV 211 and MH 217 to switch the lines between a reference voltage, floating, and charge transfer positions in accordance with bursting sequences described below.

Circuitry 230 may be used to provide multiplexing of drive signals and to providing timing and control signals switch components during driving and sensing of the device 100. Circuitry 230 may include a microcontroller in some embodiments to provide control signals for providing drive signals, sensing transferred charge, and for calculating touch positions. Circuitry 230 is representative of drivers to provide the drive signals, and receivers for receiving sensed signals from electrode patterns. One example circuit for driving and sensing may be found in U.S. Pat. No. 6,452,514.

Figure 3:
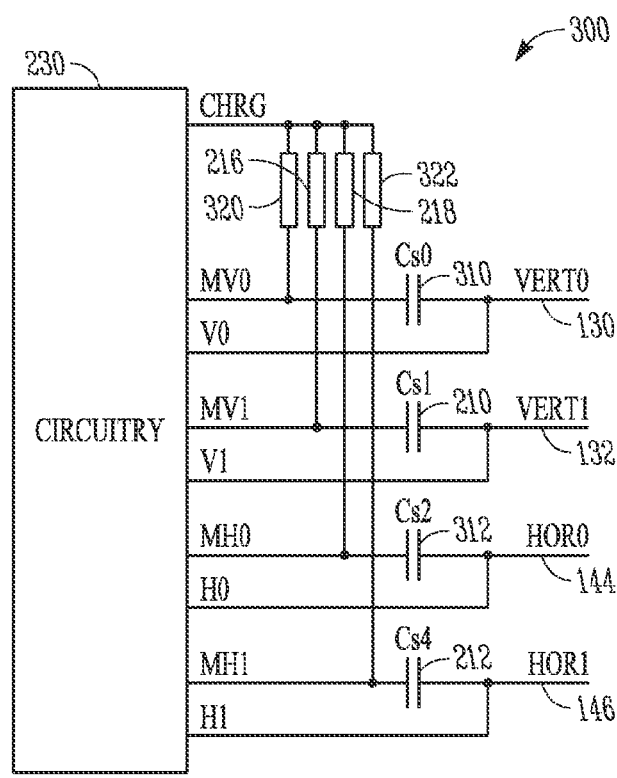
FIG. 3 is a block circuit diagram illustrating alternative connections and circuitry to interface with a touch sensitive device according to an example embodiment.

In a further embodiment 300 in FIG. 3, sense circuitry, such as sense capacitors 310 and 312 may also be coupled to line VERT0 130 and HOR0 144 respectively. Performance of charge measurement may or may not be better than that provided by just using sense capacitors 210 and 212, as one capacitor coupled to each set of electrodes should suffice to collect the transferred charge given the low resistance of the electrodes in this embodiment. Further ramping resistors 320 and 322, used for analog to digital conversion, may also be used as shown in FIG. 3 in conjunction with sense capacitors 310 and 312.

Figure 4A:
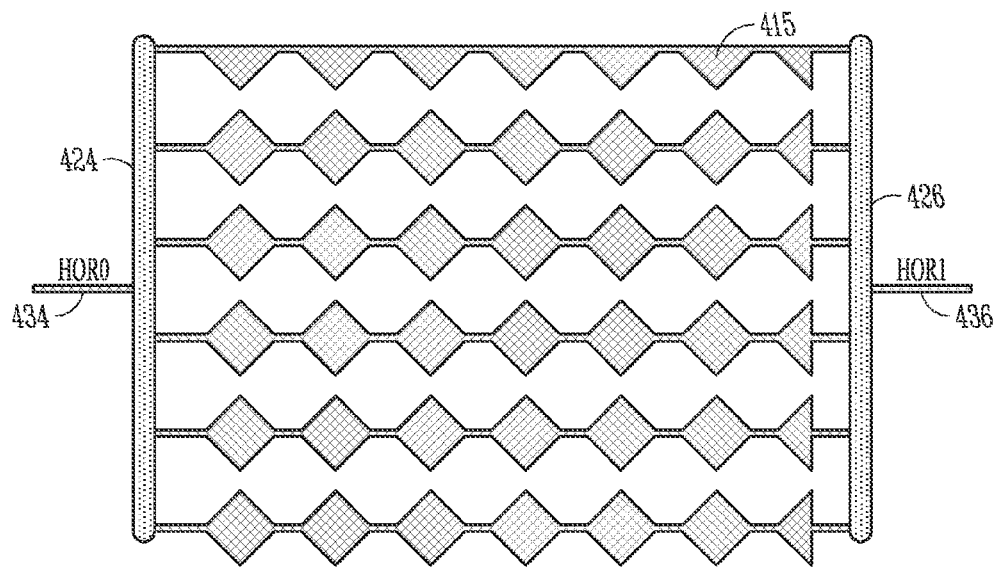
FIGS. 4A and 4B are top views of two electrodes of an alternative electrode layout for a touch sensitive device according to an example embodiment.
Figure 4B:
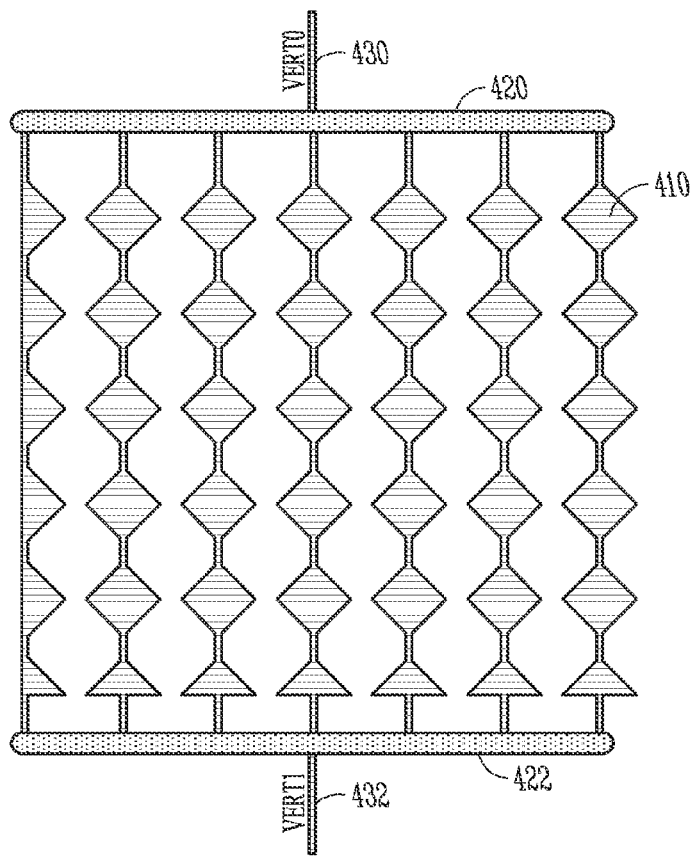
Figure 4C:
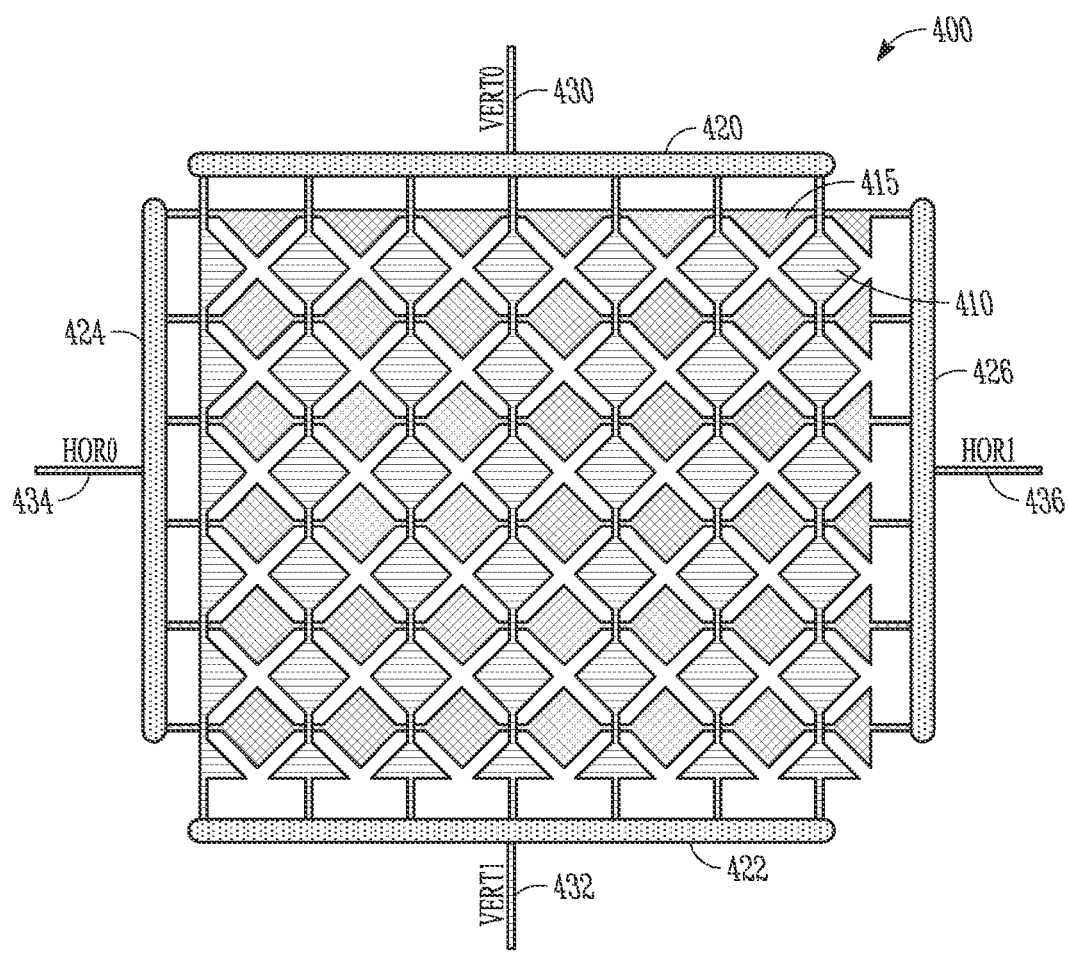
FIG. 4C is a top view of combined electrodes from FIGS. 4A and 4B.

FIGS. 4A, 4B, and 4C are top views of separate and combined electrodes of an electrode layout 400, where the electrodes are formed using a transparent conductive material, such as ITO. In this embodiment, a diamond pattern is again formed, but using a conductive material that has a resistance to it suitable for forming an electric field gradient. In this embodiment, sets of electrodes 410 and 415, are again formed as rows and columns of diamond shapes respectively, connected at corners by strips of the conductive material.

The sets of electrodes 410 and 415 are coupled at each end by a conductive bar 420, 422, 424, 426 that does not result a significant electric field gradient between adjacent rows or columns of each set of electrodes. Bar 420 is coupled to one end of each of the electrodes in electrode set 415, and bar 422 is coupled to the other end of the electrodes in electrode set 415. Bar 420 is coupled to a line 430, referred to as VERT0, and bar 422 is coupled to line 432, VERT1. Application of a voltage via line 430 VERT0, while line 432 VERT1 is coupled to a reference voltage, results in an electric field gradient being formed along electrode set 415 between the ends coupled to bars 430 and 432. An opposite gradient may be formed by providing a drive voltage signal on line 432 VERT1 and a reference on line 430 VERT0. Bars 424 and 426 are coupled to respective ends of electrode set 410, and also to lines 434 HOR0 and 436 HOR1 to create a similar gradient when either line is driven and the other held to a reference.

Figure 5A:
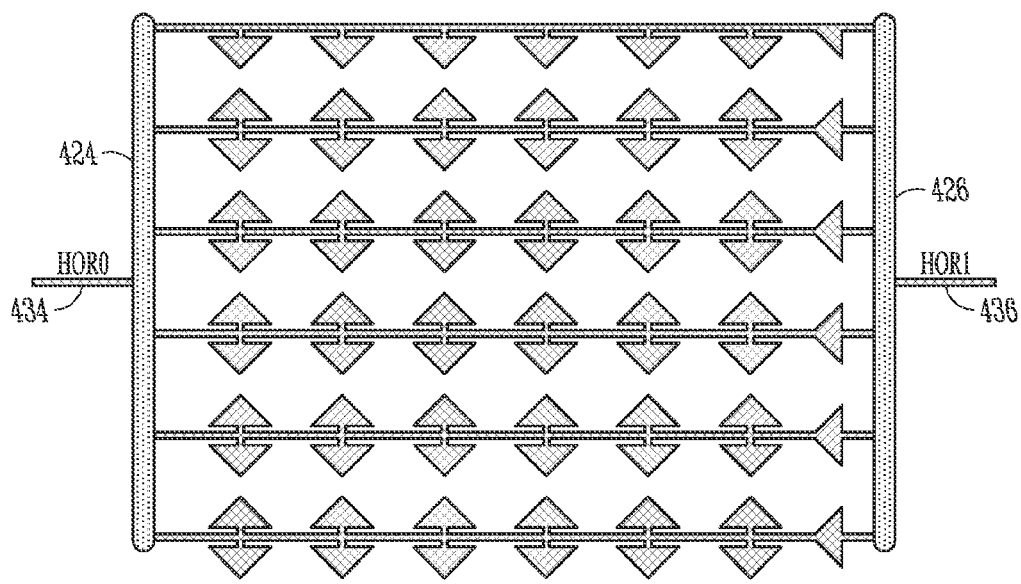
FIGS. 5A and 5B are top views of two electrodes of a further alternative electrode layout for a touch sensitive device according to an example embodiment.
Figure 5B:
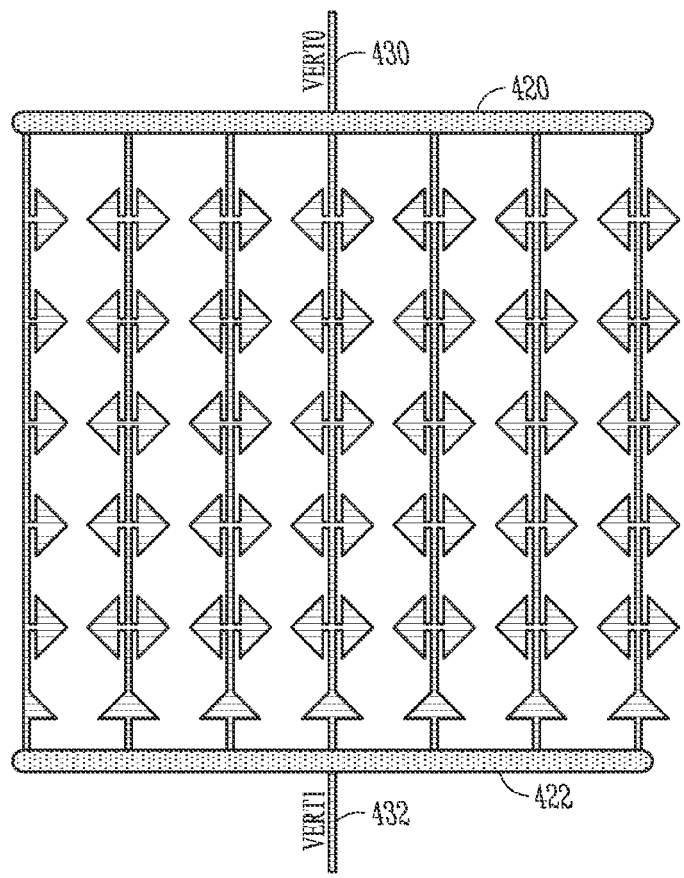
Figure 5C:
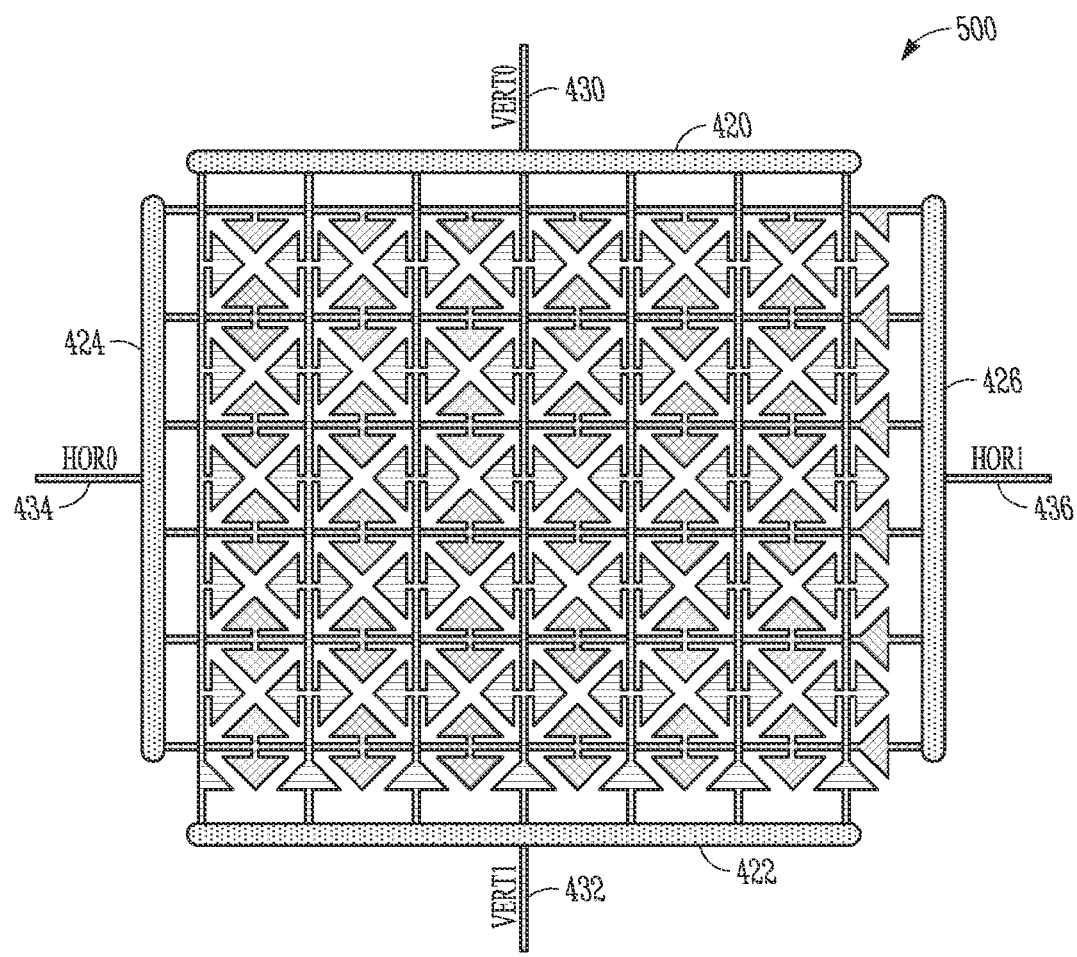
FIG. 5C is a top view of combined electrodes from FIGS. 5A and 5B.

FIGS. 5A, 5B, and 5C are top views of separate and combined electrodes of an electrode layout 500, where the electrodes are formed using a transparent conductive material, such as ITO. Layout 500 is similar to layout 400, and utilizes the same reference numbers where elements remain unchanged. In layout 500, the diamond pattern of shapes has been modified to increase the resistance as a row or column of electrode shapes is traversed between bars. Cuts have been made in the diamond shapes to split them, and connect the split diamonds by a conductive path, resulting in a higher resistance for each column and row. In one embodiment, the electrode resistance is similar to that of a narrow strip of material, similar in width to that of the strips connecting corners of the diamond shapes in FIG. 4. In one embodiment, all the cuts are consistent to obtain a uniform pattern that results in a smooth electric field gradient when the sets are driven. In other embodiments, the cuts may be varied to obtain other than a smooth gradient.

The layouts 400 and 500, as well as layout 100 may be driven and sensed in accordance with circuitry 200 or 300 as described above. Touch position may be calculated by measuring the accumulated voltage on the sampling capacitors separately on two perpendicularly oriented sets of electrodes having electric field gradients on two layers. Driving one end of one set and grounding the other end, creates a gradient of the field across the set of electrodes which in one embodiment is smoothly modulating sensitivity across the set of electrodes from maximum to zero. The signal is acquired from the other set of electrodes which work like a single receiver plate. Then, the sets of electrodes are swapped, reversing the roles of the sets, so the other set is driven with the remaining set now operating as the single receiver plate.

Reference signals RH are obtained by driving both opposite sides of a set of electrodes (for example VERT0 and VERT1) and acquiring the signal on the opposite layer (HOR0 and HOR1). Driving in this manner removes the gradient of the sensitivity across the surface of an electrode set such that the entire electrode set has equal sensitivity across the entire surface to work as a uniform, unitary capacitive key.

To get the complete XY position in one embodiment, six different drive signals may be applied to different lines of the sets of electrodes. In one embodiment, the drive signals take the form of bursts of voltage pulses that result in charge transfer from one electrode set to another. The amount of charge transferred may be affected by a touch. The signals utilized in one embodiment are described in table form in FIG. 6. The first column in FIG. 6 refers to a burst number, which each may include one or more pulses of electricity. The order may be changed as desired. For each burst, the status of each of the connections, VERT0, VERT1, HOR0 and HOR1 are then described in subsequent columns. For example, during burst number 1, VERT0 is driven with the bursts, VERT1 is tied to a reference, such as ground, HOR0 is floating, and HOR1 is acquiring transferred charge. The acquired charge is labeled in the next column referred to as signal. The signals, including references, acquired include SV1, SV2, RV, SH1, SH3 and RH, where RV and RH are reference signals from driving both ends of each set of electrodes.

There are several types of bursts for identifying a touch event. Some burst types measure the position along one axis of a sensing surface. For example, such a burst type may drive one end of electrodes spanning a sensing area and ground the other end, which creates gradient of the field. A signal is acquired using electrodes spanning the sensing area in a different direction than the driven electrodes. These signals are shown in FIG. 6 as SV1, SV2, SH1 and SH2.

Another burst type measures the strength of a touch. Such bursts may simultaneously drive both ends of a screen, converting the whole screen into a capacitive key with the same sensitivity across the whole area. The acquired signal provides a reference to allow a more precise calculation of touch position by reducing the effect of signal strength on the reported touch location. It is understood that other burst types are possible for sensing touch events without departing from the scope of the present subject matter, including, but not limited to, burst types using mutual capacitance as discussed above and burst types using self-capacitance to sense a touch event.

Burst number 1 in FIG. 6 measures a signal with a vertical gradient having a maximum signal on VERT0 to a minimum signal on VERT1. Burst number 2 measures the signal with the vertical gradient reversed, such that the maximum signal is on VERT1 with a minimum signal on VERT0. In burst number 3, the signal is measured without a vertical gradient because both VERT0 and VERT1 are driven. In burst number 4, the signal is measured with a horizontal gradient, corresponding to a maximum signal on HOR0 and minimum signal on HOR1. In burst number 5, the gradient is reversed, and in burst number 6, there is no horizontal gradient as both are driven.

The formulas for calculating the positions divide an area into two zones where one of the signals is stronger than the other and each zone has its own formula. The transition between the two formulas as a touch moves between the two zones does not create a glitch because both formulas yield the same result at the transition. The ideal signals from horizontal measurements between a point "$X_{min}$" and "$X_{max}$" on a touch sensitive device are shown in FIG. 7. FIG. 7 illustrates how signal relationships change if the touch moves from a horizontal coordinate $X_{min}$ on the left of the touch sensitive device to a horizontal coordinate $X_{max}$ on the right side of the touch sensitive device. Point A is the value of RH at a particular touch point X0, B is the value of SH1 at X0, and C is the value of SH2 at X0. A similar graph (not shown) represents how signal relationships change between SV1 and SV2 as a touch moves, for example, from a point "$Y_{min}$" at the bottom of a touch area to a point "$Y_{max}$" at the top of the touch area.

In various embodiments, a burst may provide a reference signal RH representative of a horizontal position at an extreme edge of the area. In some embodiments, RH is a predetermined constant.

As stated above, for calculating a touch position including a horizontal coordinate, the horizontal area of a touch screen, for example, is divided into two zones. Horizontal zone 1 includes an area where the SH1 field 715 is stronger than or equal to the SH2 field 720 (e.g. the area to the left of Xm, 710). Horizontal zone 2 includes the area where SH2 is stronger than SH1.

Thus, when SH1 is bigger than or equal to SH2, the horizontal coordinate, X, of a touch event is calculated as:

$$X = N_h\left(\frac{RH - SH1}{2*RH - (SH1 - SH2)}\right)$$

where $N_h$ is a scaling factor that can be used to provide a given range of coordinate values between positions $X_{min}$ and $X_{max}$ when $X_{min}$ is zero.

When SH2 is bigger than SH1 the horizontal coordinate, X, is calculated as:

$$X = N_h\left(1 - \frac{RH - SH2}{2*RH - (SH1 + SH2)}\right)$$

To calculate a vertical coordinate of a touch event, signals SV1, SV2 and RV are used. The vertical area of a touch sensitive area is divided into two zones. Vertical zone 1 includes an area where the SV1 field is stronger than or equal to SV2 field. Vertical zone 2 includes the area where SH2 is stronger than SH1.

When SV1 is bigger than or equal to SV2 a vertical coordinate, Y, of a touch event is calculated as:

$$Y = N_v\left(\frac{RV - SV1}{2*RV - (SV1 - SV2)}\right)$$

where $N_v$ is a scaling factor that can be used to provide a given range of coordinate values between positions $Y_{min}$ and $Y_{max}$.

When SV2 is bigger than SV1 a vertical coordinate, Y, of a touch event is calculated as:

$$Y = N_v\left(\frac{RV - SV2}{2*RV - (SV1 + SV2)}\right)$$

where, with reference to FIG. 6,
SV1 is the signal measured during burst #1.
SV2 is the signal measured during burst #2.
RV is a reference signal measured during burst #3.
SH1 is the signal measured during burst #4.
SH2 is the signal measured during burst #5.
RH is a reference signal measured during burst #6.

In some embodiments, RH and RV need not be used. RH and VH, when used, provide the ability to determine touches accurately across the screen. The errors would generally be largest at the edges of the screen. In further embodiments, a weighted average formula may be obtained from the above formulas for calculating positions. One example formula for calculating the X coordinate of a touch event may be written as:

$X=N_h(1*(RH-SH1)+2*(RH-SH2))/(2*RH(SH1+SH2)-)-M$.

Example burst timing compositions for each of the above bursts of FIG. 6 are now described with reference to FIGS. 8-13. Burst sequence number one of FIG. 6 is shown expanded in FIG. 8. Bursting of pulses is done on V0, with V1 connected to GND or another reference voltage, while H0 is left floating. Measuring is performed on H1, corresponding to the signals from a first vertical gradient. As previously indicated, the acquisition bursts described herein are just one example of drive signals that may be used. Many other drive signals and charge acquisition methods may be used in further embodiments.

At a first step in FIG. 8, referred to as an initial discharge state, all capacitors are fully discharged. V0, MV, V1, H0, MH, and H1 are initially coupled to ground (as represented by a '0' in the table), or other reference voltage. At step 2, MV, H0 and H1 are allowed to float (as represented by a 'F' in the table). At step 3, charge is transferred from V0 (by driving pin V0 high, as represented by a '1' in the table) and accumulated on sense or sampling capacitor Cs1. At step 4, MH is allowed to float, floating Cs to end the charge transfer. At step 5, H1 is coupled to ground to discharge parasitic capacitance, Cp. At step 6, V0 is coupled to ground, discharging the unknown capacitance, Cx. At step 7, H1 is allowed to float to prepare for the next transfer. At step 8, MH is grounded to ground Cs to prepare for the next transfer. At step 9, steps 3-8 are repeated N times until the acquisition burst is completed, where 'N' is a predetermined number designed to provide a targeted amount of signal gain and noise suppression by virtue of repetitive signal accumulation; 'N' in the context of this and further table figures herein, may be any integer number and may also include zero. At step 10, MH is floated to prepare for the measurement. At step 11, MN is coupled as an analog comparator input, and H1 is coupled to ground. At step 12, the CHRG line to the sense circuitry is coupled to perform measurement of the signal via ramping of the voltage on the sample capacitor(s) via a resistor such as 216, until the voltage on the sample capacitor reaches a predetermined voltage, the measurement being taken by timing the interval required to reach the predetermined voltage. The above explanations apply also similarly to FIGS. 9 through 13 with modifications as will be discussed below.

The floating states are used explicitly in some embodiments to avoid cross-conduction when output drivers of pins switch on and off. In some microcontrollers, during transitions between floating and output states and vice-versa while one pin is "semi output", another connected to the other side of a sampling capacitor is also "semi output". The result can be a significant, unpredictable and thermally dependent amount of charge being destroyed on the sample capacitors due to such cross-conduction. However, the burst sequences will operate adequately if floating states are not expressly used as shown in the various table figures in some embodiments, specifically if the output drivers avoid such cross-conduction by their intrinsic design.

Burst step number 2 of FIG. 6 is expanded as illustrated in FIG. 9. This step consists of bursting pulses on V1, with V0 connected to GND while H0 is floating, with measuring performed on H1 to acquire a second vertical gradient. The individual steps illustrated in FIG. 9 are similar to those in FIG. 8 as discussed supra, except that in step 3, charge is transferred from pulses on V1 instead of V0.

Burst step number 3 of FIG. 6 is expanded as illustrated in FIG. 10. This step consists of bursting pulses on both V0 and V1 with H0 floating, while measurement is performed on H1. This acquires signal without a voltage gradient, so that the entire screen responds as a single unitary 'key' without differentiation as to touch position. As discussed, the signal resulting from this step is used as a reference RV in order to make position calculations along the vertical axis more precise by reducing the influence of signal strength variations.

Burst step number 4 of FIG. 6 is expanded as illustrated in FIG. 11. This step consists of bursting pulses on H0, with H1 connected to GND with V0 floating, while measurement is performed on V1 in order to acquire signal with a first horizontal gradient.

Burst step number 5 of FIG. 6 is expanded as illustrated in FIG. 12. This step consists of bursting pulses on H0 while H1 is connected to GND and V0 is floating, with the measurement being taken on V1 in order to acquire a second horizontal signal gradient.

Burst step number 6 of FIG. 6 is expanded as illustrated in FIG. 13. This step consists of bursting pulses on H0 and H1 while V0 is floating while measuring signal on V1. This acquires signal without a voltage gradient, so that the entire screen responds as a single unitary 'key' without differentiation as to touch position. As discussed, the signal resulting from this step is used as a reference RH in order to make position calculations along the horizontal axis more precise by reducing the influence of signal strength variations. Each of sequences numbers 4, 5, and 6 correspond closely to sequences 1, 2, and 3 respectively except that opposite sets of electrodes are driven and sensed.

Figure 14:
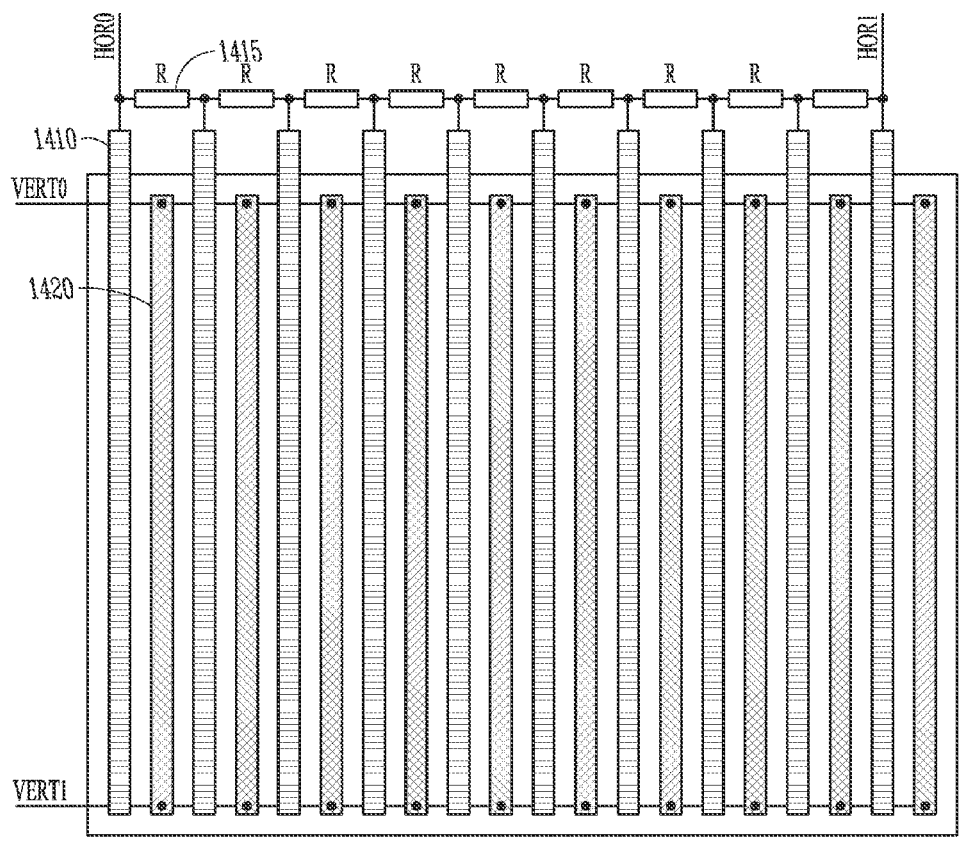
FIG. 14 is a top view of a single layer electrode layout for a touch sensitive device according to an example embodiment.

Using a single layer ITO design in one embodiment may result in one or more advantages like reduced cost, increased reliability, higher yield rate, etc. Also, the difference between the gains in the measurements on the top and the bottom layer will become minor since such a configuration has no Z-axis layer displacement. One solution for using ITO for such touch screen is shown on FIG. 14. The whole design is formed of multiple substantially parallel lines.

Half of the lines 1410 are used to create a horizontal gradient between connectors HOR0 and HOR1. Lines 1410 may utilize externally connected resistors 1415. In some embodiments, resistive structures may be formed of ITO or other resistive material. The other half of the lines 1420 are used to create a vertical gradient between VERT0 and VERT1. Lines 1420 may be connected in parallel. When using equal thickness lines it is possible that the resistance of the lines 1420 connected in parallel may be low, resulting in a sub-optimal vertical gradient.

Figure 15:
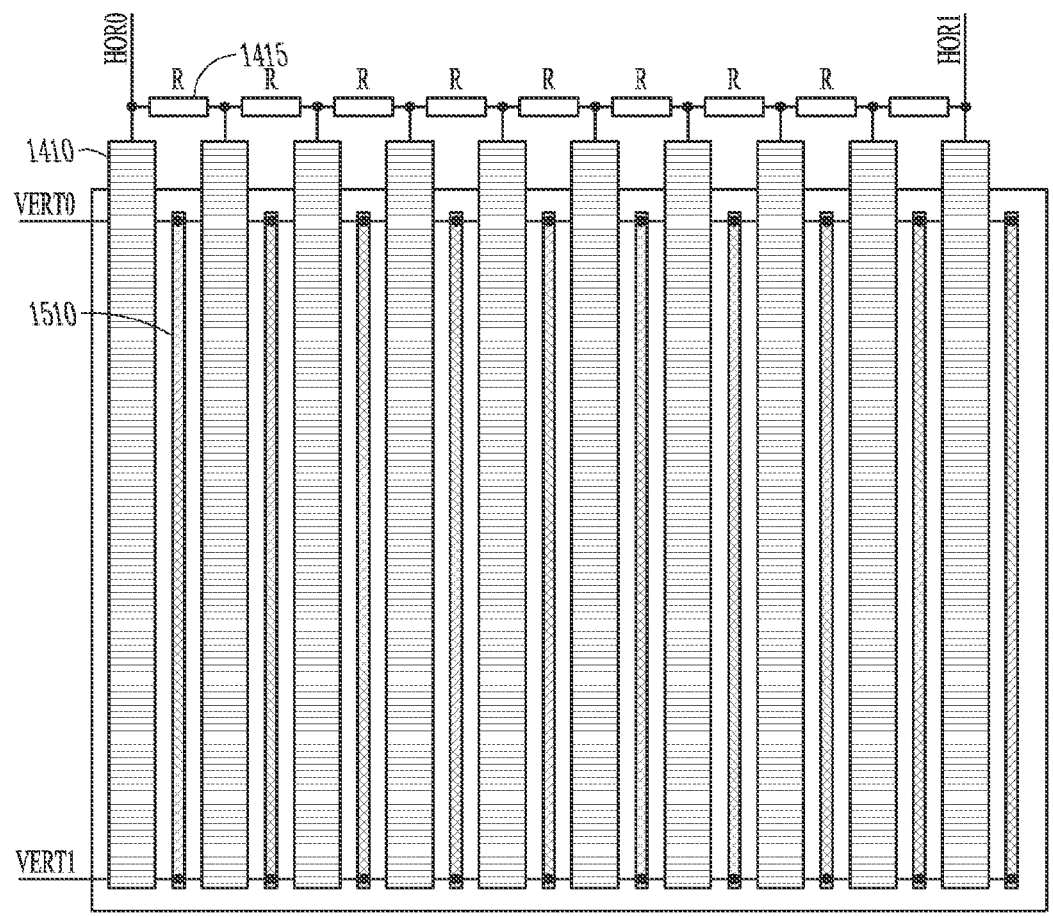
FIG. 15 is a top view of an alternative single layer electrode layout for a touch sensitive device according to an example embodiment.

In FIG. 15, lines 1510 used to form a vertical gradient are made narrower than the lines 1410 used to create the horizontal gradient. To obtain 2K resistance across 10 vertical bars in parallel between VERT0 and VERT1 the resistance of each bar should be 20K in one embodiment. Other resistances may be used in further embodiments. Also, using a higher resistance ITO layer will help to increase the resistance between VERT0 and VERT1 to a desired range. In further embodiments, zigzag patterns (not shown) may be used to increase the resistance of the bars connected between VERT0 and VERT1. It is understood that other methods and circuits for mutual capacitance type touch event sensing are possible without departing from the scope of the present subject matter. In addition to charge transfer circuits and method used for example herein, other methods include, but are not limited to, amplitude detection, RC time constant measurements, modified charge transfer methods, charge transfer methods using filtering such as 'leaky integrators' having an asymptotic response, and combinations thereof.

Various embodiments of the disclosed electrode patterns allow various methods of touch event detection, including various methods of proximity detection. One form of proximity detection may be accomplished using self-capacitance, instead of mutual capacitance as described above. Proximity detection using self capacitance is possible because self capacitance field lines freely radiate outward into free space from the electrodes. A four electrode touch screen according to various embodiments of the present subject matter allows simple implementation of proximity detection by issuing on regular intervals, parallel bursts on both channels. A self capacitance type proximity burst is shown in FIG. 16, which is used in conjunction with the circuit of FIG. 2. A parallel burst on two channels is provided by keeping CHRG, V0 and H0 floating during the burst, allowing the field lines to propagate away from the surface of the screen. It is understood that other methods of self-capacitance proximity sensing are also possible without departing from the scope of the present subject matter, for example, but not limited to, RC time constant sensing.

Proximity detection acquisitions using self-capacitance maybe combined with mutual capacitance acquisitions in various ways. For example proximity bursts may be suspended when a touch is detected on the surface, as additional proximity detection consumes processing resources that may be available for, among other things, identifying the location of the touch event. In other instances it would be desirous to acquire in both mutual and self capacitance modes, for example when it is not yet clear that a finger has touched the screen surface, eg when signals indicate an ambiguous condition. In yet another condition, it would be desirable to only sense using self-capacitance in a proximity detecting mode when the signals from self-capacitance are weak, eg, when it is clear there is no touch present on the screen surface. The ratio of self-capacitance to mutual capacitance acquisition bursts over time can be adjusted to suit various signal conditions in order to optimize response time and power consumption.

Normally, the touchscreen design utilizes a shape of the screen that is rectangular, not square. Using only four electrodes on rectangular shaped screens can make the resolution and/or the linearity across the X and Y directions more or less unequal. For higher aspect ratio screens, it is desirable to maintain a consistent resolution and linearity along each axis. One solution is to add more electrodes in one of the directions. One of the possible designs is to use five electrodes, two to detect the position in the horizontal direction, and three to detect the position in the vertical direction as indicated in layout 1700 in FIG. 17 and corresponding connections in FIG. 18. Layout 1700 in one embodiment is formed of resistive electrode material that is formed in two sets of parallel lines in a single layer, forming horizontal and vertical electric field gradients when driven. In this embodiment, Cs0 is shown coupled to VERT1, but in further embodiments, Cs0 may be coupled to VERT0 or VERT2.

Figure 18:
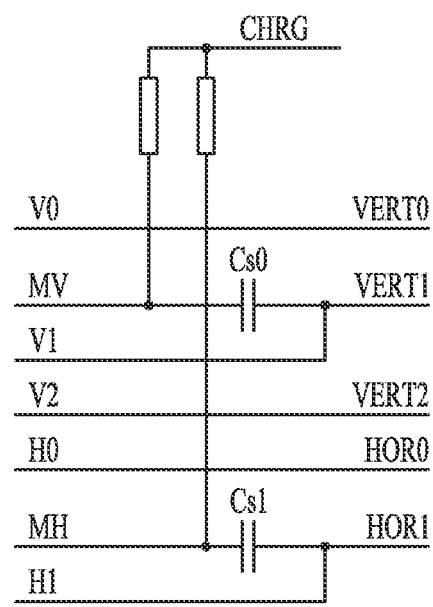
FIG. 18 is an example circuit diagram illustrating connections to the electrode layout of FIG. 17.

In order to get enough information to calculate the touch position and to compensate the offsets the design of FIG. 18 employs seven different acquisition burst steps as illustrated in FIG. 19, with the additional burst over that of FIG. 6 being used to measure signal from driving VERT2. To obtain touch position in the horizontal direction, three bursts, 5, 6, and 7 are used. To obtain position in the vertical direction, four bursts, 1 through 4, are used. Notice that the design still utilizes just two sampling capacitors and two conversion ramping resistors. Other methods and circuitry to detect a touch position are possible without departing form the scope of the present subject matter. For example, in some embodiments, the ramping resistors may be omitted when using an alternative analog to digital converter to measure accumulated charge or when using an operational amplifier charge integrator in place of capacitors Cs.

Because the design may be made using two sampling capacitors (one for horizontal and one for vertical measurements) there will be no difference in the gain between different channels measured on the same sampling capacitor, resulting in improved linearity.

Figure 17:
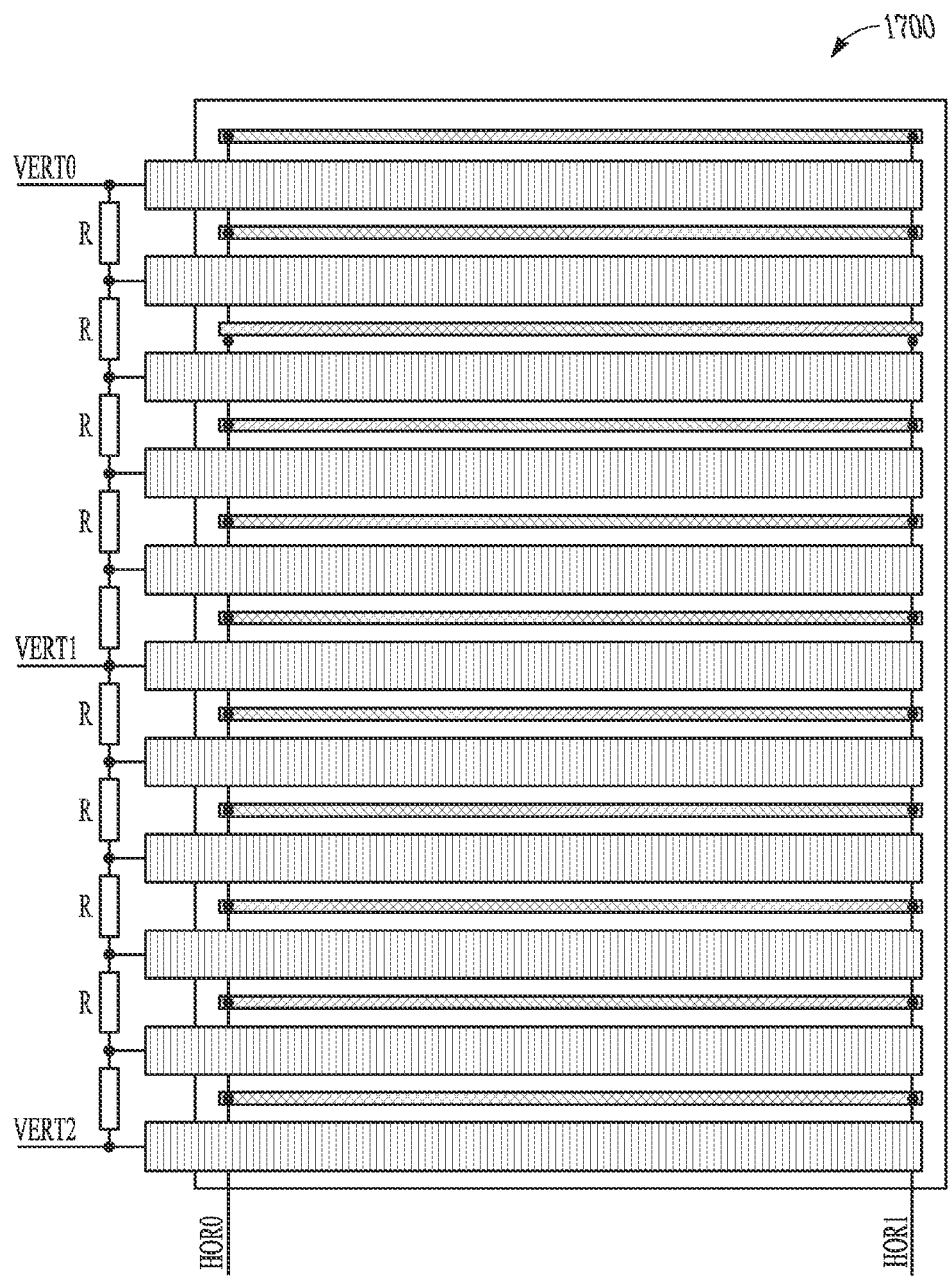
FIG. 17 is a top view of a single layer electrode layout having more than two vertical axis electrodes according to an example embodiment.

With respect to FIG. 17, additional electrodes may be added in the vertical direction without the need to add more Cs sampling capacitors. Additional electrodes may be added to the vertical direction in similar fashion.

Figure 20:
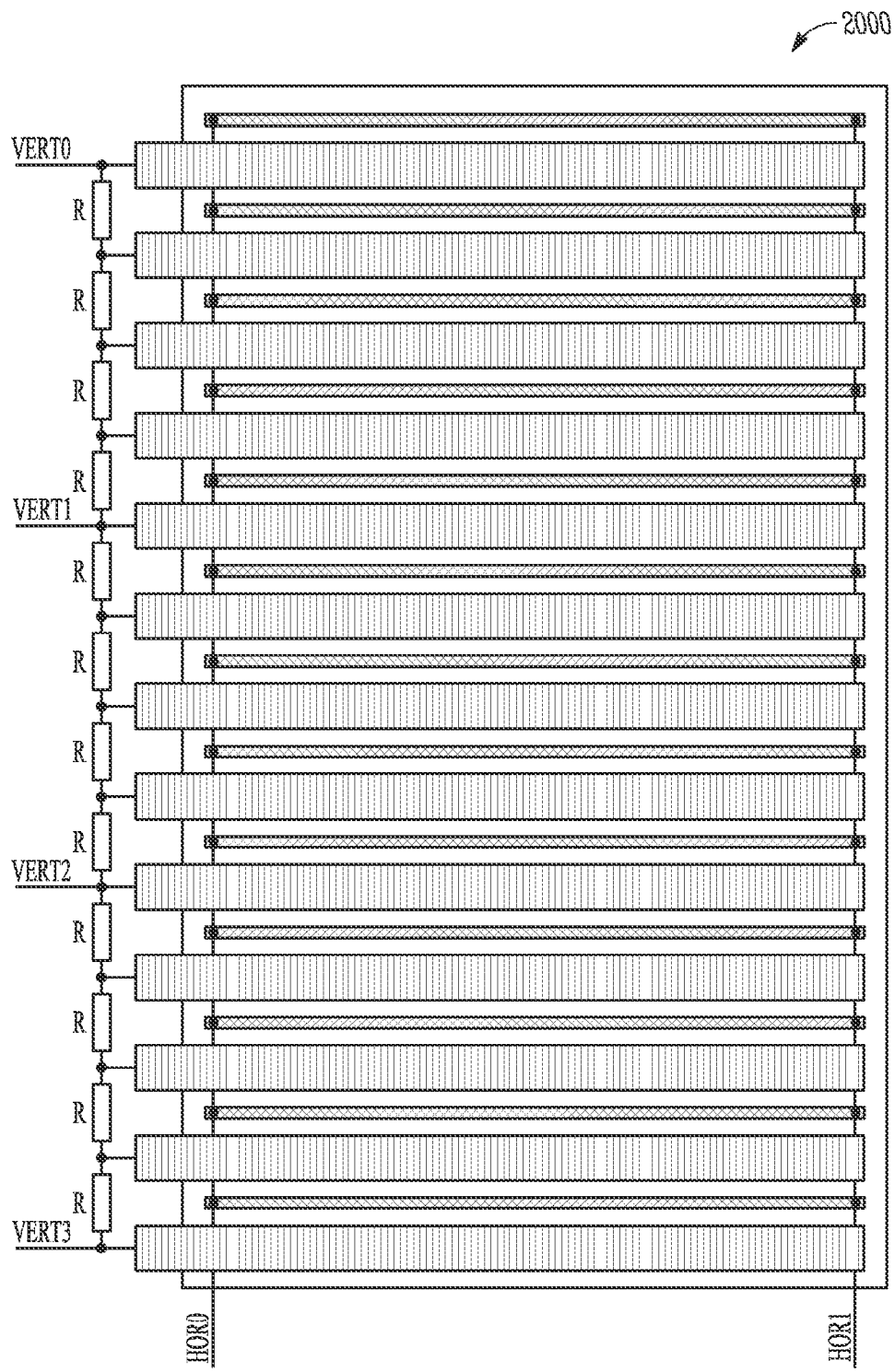
FIG. 20 is a top view of a single layer electrode layout having more than two vertical axis electrodes according to an example embodiment.
Figure 21:
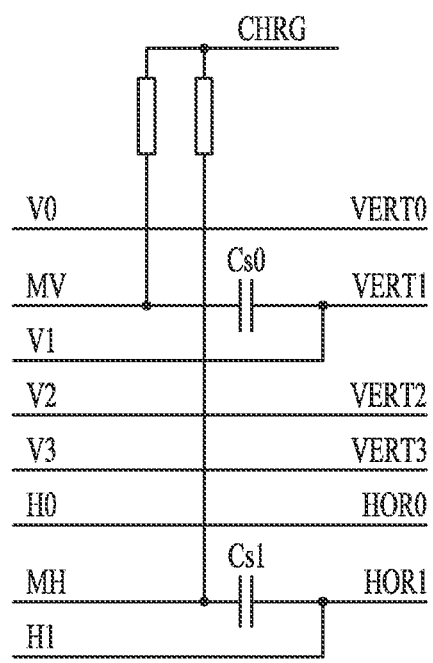
FIG. 21 is an example circuit diagram illustrating connections to the electrode layout of FIG. 20.

FIG. 20 shows a six electrode design 2000 on single layer ITO, where four electrodes, VERT0 to VERT3 are used on the vertical axis. Connections are shown in FIG. 21, illustrating the use of two sampling capacitors.

The six electrodes touch screen utilizes eight different bursts. The bursts are shown in FIG. 22. Compared to the burst sequence table of FIG. 19, additional bursts are used to measure signals from driving added electrode VERT3. As illustrated in conjunction with FIGS. 17, 18, 19, 20, 21 and 22, electrodes may be added in along at least one axis while still using only one Cs sample capacitor per axis.

Figure 23:
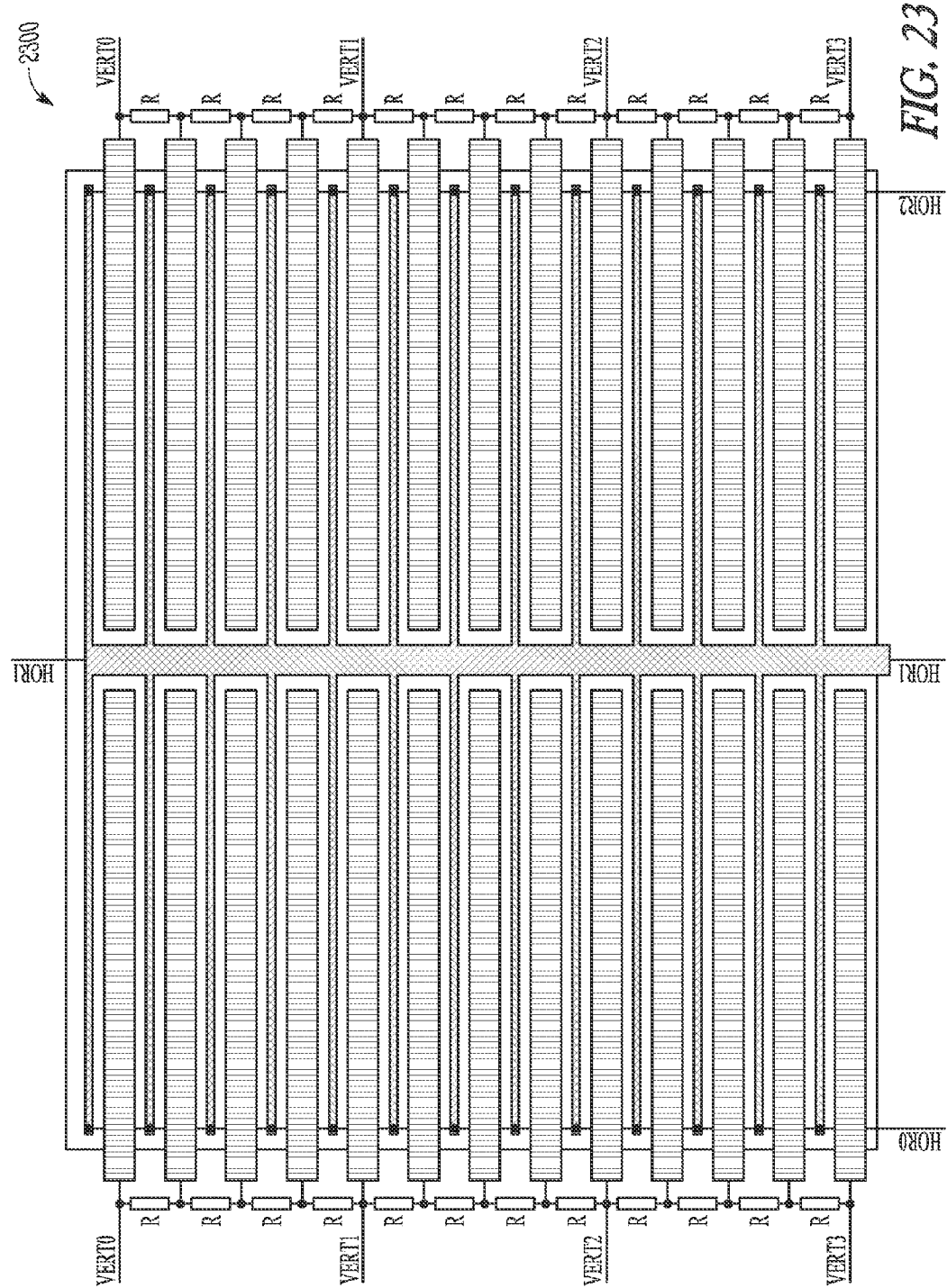
FIG. 23 is a top view of a single layer electrode layout having more than two horizontal axis electrodes according to an example embodiment.
Figure 24:
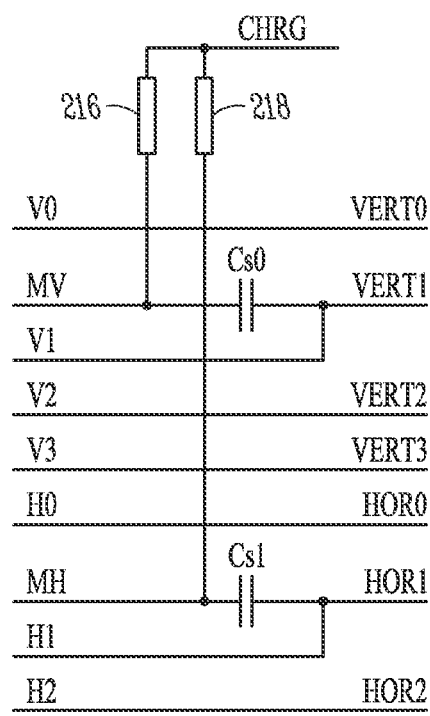
FIG. 24 is an example circuit diagram illustrating connections to the electrode layout of FIG. 23.

In still further embodiments, more electrodes may be added in both directions as illustrated in FIG. 23 at layout 2300 and corresponding connection diagram in FIG. 24. In this case the whole screen is divided into two lateral sections which work in a similar way to layout 2000; the left and right VERTn halves are connected in identical fashion to the same circuit lines so that the two halves behave as though they were continuous across the screen, but for the brief interruption of the HOR1 spine. The burst sequence consists of nine bursts as shown in FIG. 25. One difference is that there will be one additional burst in the horizontal direction as shown in step 8, resulting in 9 steps.

The design 2300 results in nonlinearity in the horizontal direction because of the resistance of the vertical spine extending between the two terminals labeled HOR1 as shown in FIG. 23. It is possible to compensate for such non linearity in software, however by decreasing the effective resistance of the spine by widening it or by the use of a material that augments conductivity along its length, the linearity can be substantially improved. However, increasing the thickness of the middle bar beyond some limit will create localized linearity problems. The middle bar may also be formed at least in part of highly conductive metal in some embodiments to reduce its resistivity. In one embodiment, Cs1 is coupled to the middle bar via HOR1 to collect transferred charge. Cs1 may alternatively be coupled to HOR0 or HOR2 in other embodiments. CS0 is shown coupled to VERT1, but may also be coupled to any of the other VERTn connectors in further embodiments.

Figure 26A:
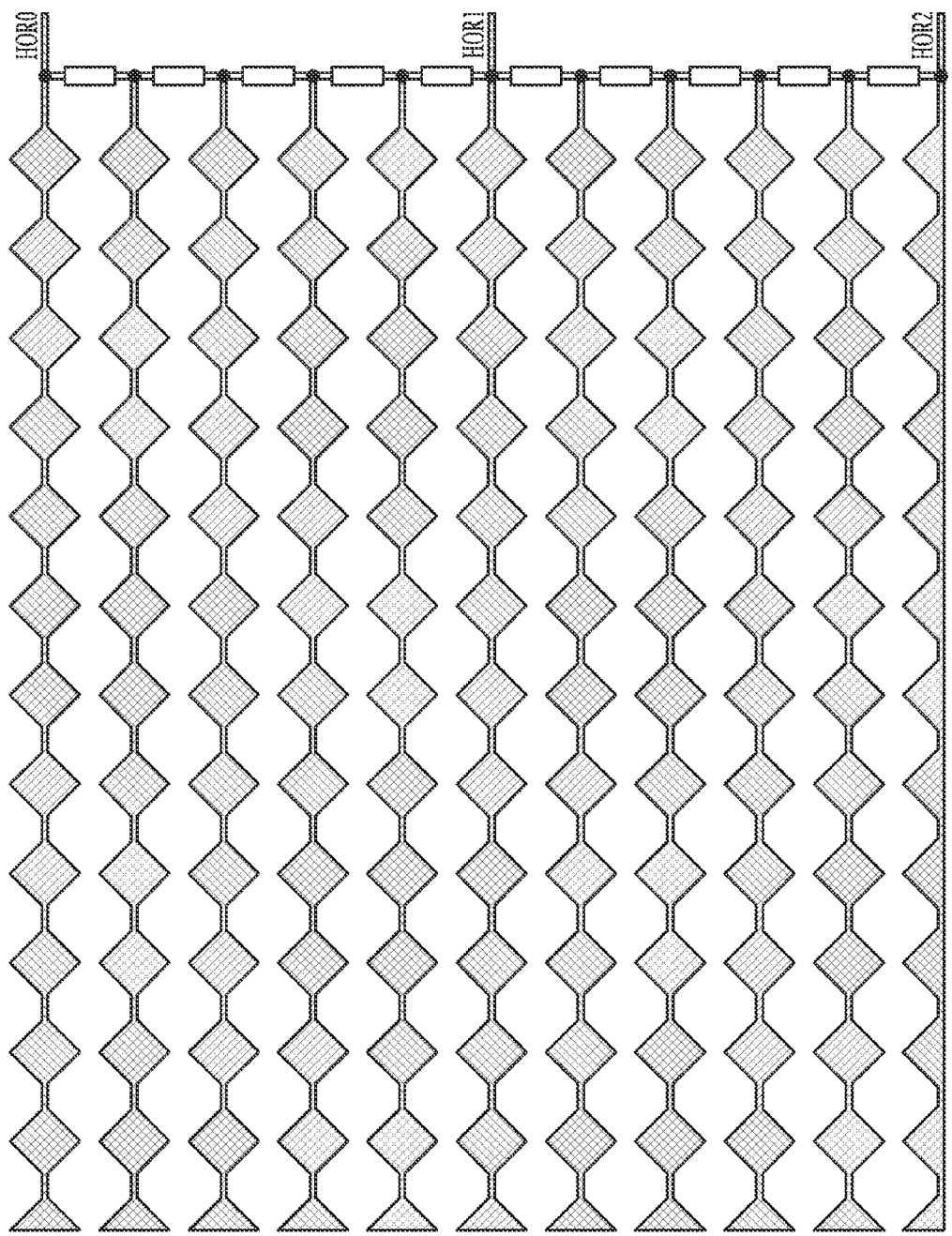
FIGS. 26A and 26B are top views of two electrodes of a single layer electrode layout having more than two vertical and horizontal axis electrodes according to an example embodiment.
Figure 26B:
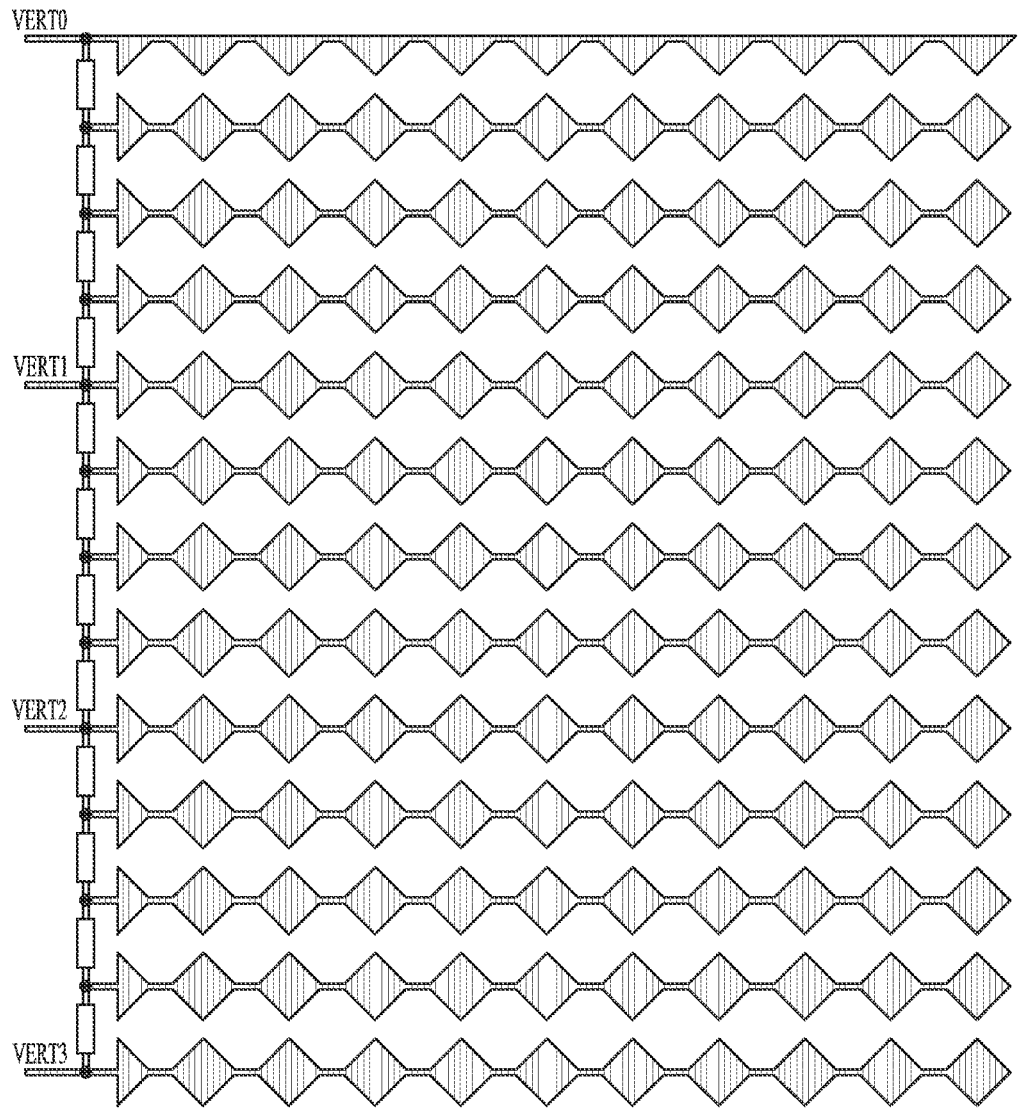
Figure 26C:
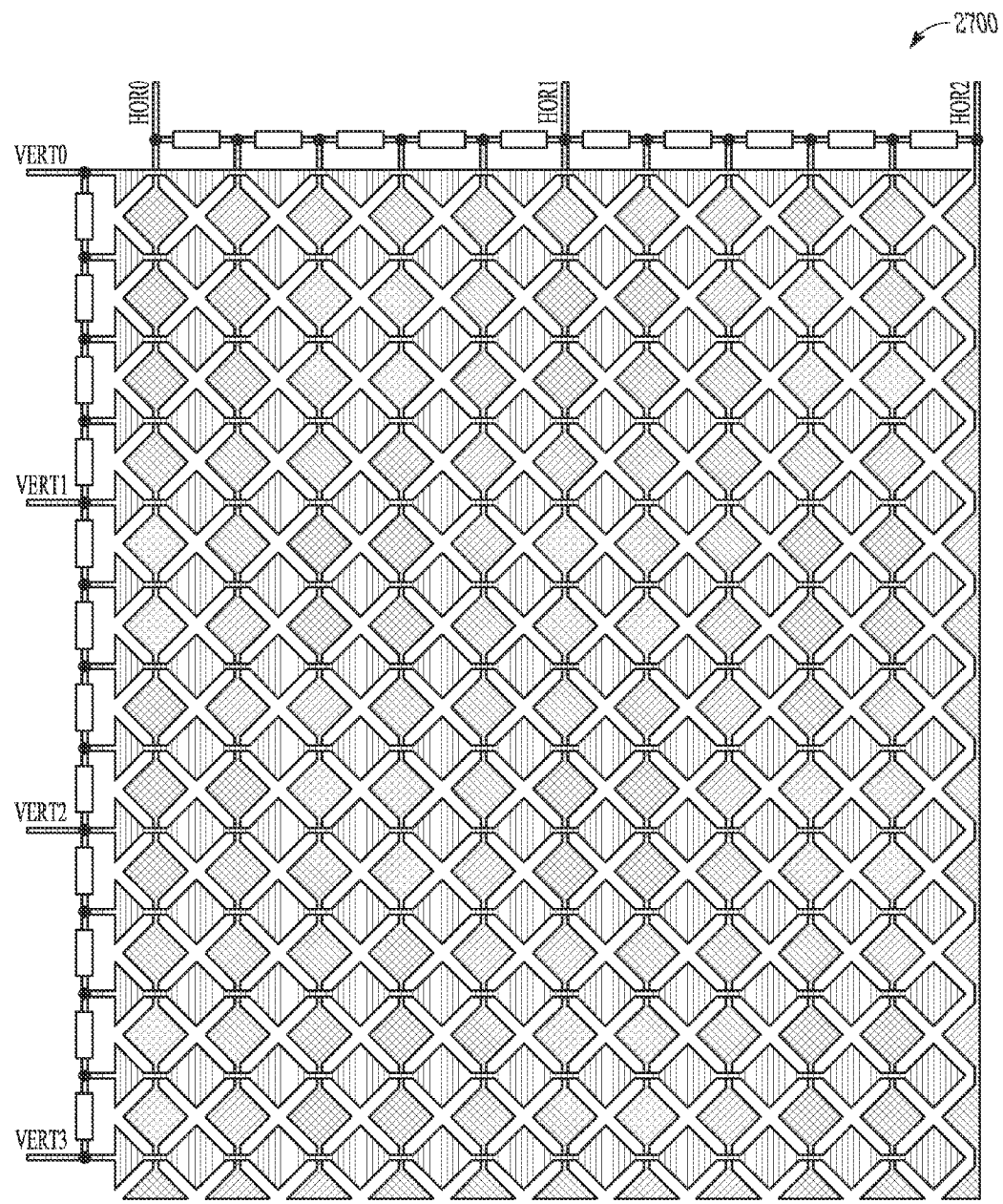
FIG. 26C is a top view of combined electrodes from FIGS. 27A and 27B.
Figure 27:
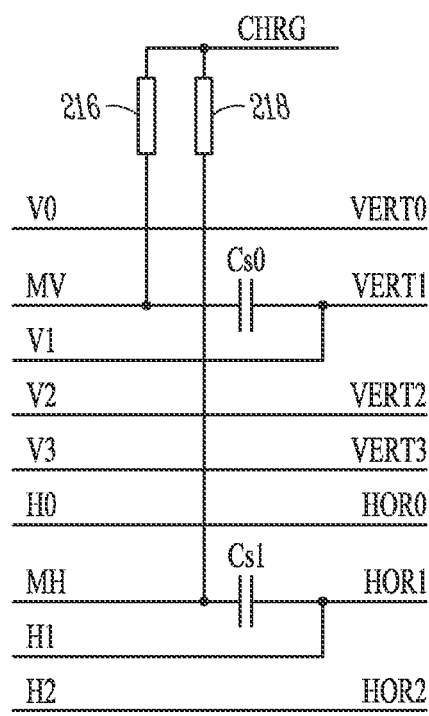
FIG. 27 is an example circuit diagram illustrating connections to the electrode layout of FIG. 26C.

FIGS. 26A, 26B, and 26C are top views of separate and combined electrodes of a seven electrode design at 2600 with two layers of ITO, or other suitable material. If the layers are formed on different sides of a substrate, such as PET, as long as the two layers are close to each other there will be little difference in the sensitivity on bottom and top side measurements. In various embodiments, PET used in the ITO designs is no more than 125 μm thick and preferably 50 um thick. FIG. 27 illustrates the connections that may be used with design 2600.

In some embodiments, electrode design 2700 may be used to form up to six different sensitive areas defined by pairs of vertical and horizontal conductive lines. In other words, the area of the design 2600 bounded by VERT0, VERT1, HOR0 and HOR1 may be treated as one area, and other areas will correspond to other pairs of vertical and horizontal conductive lines. In this manner, touches in separate areas may be independently detected, even if occurring at the same time. This mode of operation may be referred to as a 'multi-touch' mode of operation. Additional sense capacitors may be used in further embodiments if desired. Bursting sequences may be changed in further embodiments to accommodate a multi-touch mode of operation.

In various embodiments, a four electrode touch sensitive device offers extreme simplicity of design, using two sampling capacitors and two ramping resistors. The ramping resistors may be omitted, instead using an ADC converter, perhaps together with an operational amplifier integrator.

The high speed, good resolution and linearity, and the ability to detect precisely the touch location will allow such devices to be used in low cost character recognition devices, including electronic writing tablets, for example. The low number of wires connecting the sensing circuit to the touch screen electrodes allows for a narrow border, permitting a more optimal use of front panel space. The connection to the screen is also simplified because of the low number of wires.

Figure 28:
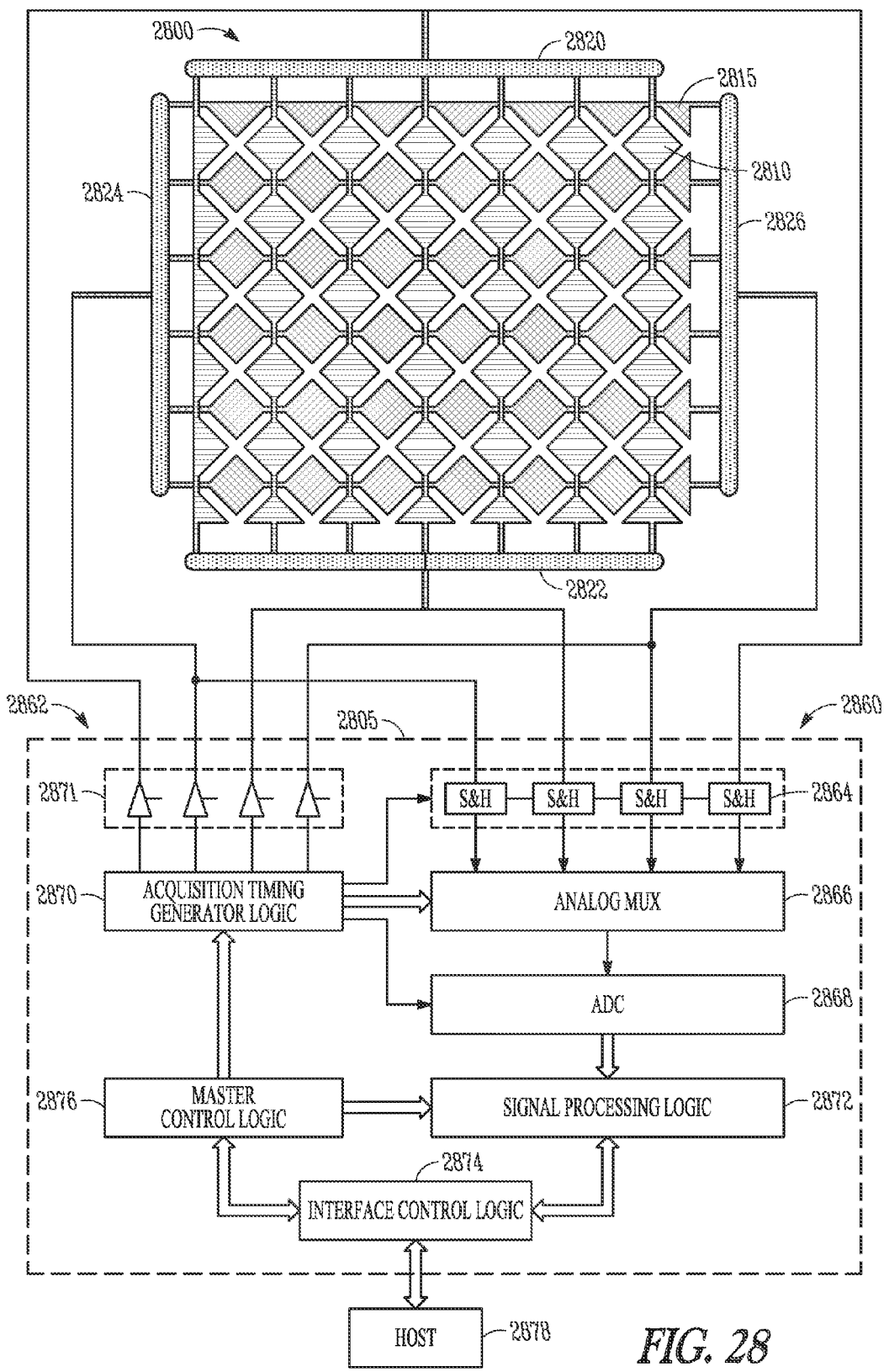
FIG. 28 is a block diagram of a touch sensitive device including circuitry to interface with the touch sensitive device according to an example embodiment.

FIG. 28 is a block schematic diagram of a touchscreen 2800 and associated touch screen controller 2805 according to an example embodiment. Touchscreen 2800 is representative of a touch sensitive device that may be used to provide an interface to different devices. Touchscreen 2800 includes sets of electrodes 2810, 2815 coupled at each end by a bar 2820, 2822, 2824, 2826. In various embodiments, each bar is of significantly higher conductivity than the screen electrodes themselves, so as not to create a significant electric field gradient between adjacent rows and columns of each set of electrodes; for example, these bars could be made of metal, while the electrodes are made of ITO. Each bar is coupled to both an input 2860 and an output 2862 of the controller 2805 to sense touch events of the touchscreen 2800.

In various methods of sensing touch events, each of the electrodes is electrically excited using the outputs of the controller, and sensed using the inputs of the controller. The controller includes several input and output components to assist in timing the excitation and sensing of the electrodes. Input components include sample-and-hold circuits 2864, an analog multiplexer 2866 and an analog-to-digital converter 2868. Samplers 2864 are also embodied as the Cs capacitors shown in the various figures herein, for example Cs0, Cs1, Cs2, and Cs3 of FIG. 3. While four samplers are shown, in many instances only two samplers are required, for example when using the topology shown in FIG. 2. Output components includes timing logic 2870 coupled to the input components to time and generate output signals in coordination with the sensing functions of the input components. Electrode drivers 2871 generate the excitation of the electrodes 2810, 2815 in response to the timing logic circuit 2870. Individual drivers at 2871 each have a 3-state capability in order to implement the floating states associated with the various burst sequences described in conjunction with the various circuits and tables discussed above, in addition to being able to drive to at least one reference voltage. A signal processor 2872 acquires and processes sensed signals from the ADC 2868. Touch events and location information is passed to a controller interface 2874. Master control logic 2876 is coupled to the interface 2874, timing logic 2870 and signal processor 2872 to provide over-all control and monitoring of the touch screen controller 2805. In various embodiments, the controller interface 2874 exchanges touch event information and status with a host device 2878.

The controller interface 2874 acts to process signals to and from a communication protocol for communicating with the host 2878. In some embodiments, a serial protocol such as serial peripheral interface (SPI) or inter; integrated circuit (I2C) may be used. Various other protocols may be used in further embodiments.

The invention claimed is:

1. A controller comprising:
   a driver to provide signals to drive electrodes of a touch sensitive device, wherein the driver provides multiple sets of drive signals to at least four different drive lines to separately couple to both ends of two sets of electrodes having electric field gradients and wherein the sets of electrodes are arranged generally perpendicular to each other and to exchange signals;
   a receiver to receive multiple sets of exchanged signals from both sets of electrodes responsive to the signals provided by the driver; and
   wherein the driver provides drive signals in the form of bursts of pulses and the pulses are provided in at least six different sets bursts corresponding to at least six different measurements.

2. The controller of claim 1 and further comprising a processor in determine a touch position responsive to the exchanged signals received by the receiver.

3. The controller of claim 2 wherein exchanged signals received as a result of the drive signals being provided to both ends of the sets of electrodes are reference signals.

4. The controller of claim 1 wherein the exchanged signals are obtained from either end of the sets of electrodes.

5. The controller of claim 1 wherein the pulses are provided in six different sets of bursts corresponding to six different measurements.

6. The controller of claim 1 wherein four of the sets of bursts correspond to driving four different corresponding ends of the two sets of electrodes.

7. The controller of claim 6 wherein two of the sets of bursts correspond to driving both ends of each of the two sets of electrodes.

8. The controller of claim 1 wherein the controller is configured to selectively drive both sets of electrodes at the same time to operate in a proximity detection mode.

9. The controller of claim 1 wherein exchanged signals are obtained from sense circuitry coupled to one set of electrodes and sense circuitry coupled to a second set of electrodes.

10. The controller of claim 9 wherein each of the sense circuitry comprises a single sense capacitor corresponding to each set of electrodes.

* * * * *